United States Patent
Liu et al.

(10) Patent No.: US 9,954,589 B2
(45) Date of Patent: Apr. 24, 2018

(54) METHOD FOR FEEDING BACK CHANNEL STATE INFORMATION, METHOD FOR RECEIVING CHANNEL STATE INFORMATION, AND DEVICE

(71) Applicant: HUAWEI TECHNOLOGIES CO., LTD., Shenzhen, Guangdong (CN)

(72) Inventors: Jianghua Liu, Beijing (CN); Leiming Zhang, Beijing (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/416,561

(22) Filed: Jan. 26, 2017

(65) Prior Publication Data

US 2017/0141827 A1 May 18, 2017

Related U.S. Application Data

(63) Continuation of application No. PCT/CN2014/083242, filed on Jul. 29, 2014.

(51) Int. Cl.
*H04B 7/02* (2017.01)
*H04B 7/06* (2006.01)
(Continued)

(52) U.S. Cl.
CPC .............. *H04B 7/06* (2013.01); *H04B 7/0626* (2013.01); *H04B 7/0639* (2013.01); *H04L 5/0048* (2013.01); *H04J 11/00* (2013.01)

(58) Field of Classification Search
CPC .. H04B 7/0456; H04B 7/0626; H04B 7/0478; H04B 7/0639; H04B 7/0691;
(Continued)

(56) References Cited

U.S. PATENT DOCUMENTS

| 8,179,775 B2* | 5/2012 | Chen ..................... H04L 1/0029 |
| | | 370/203 |
| 9,258,044 B2* | 2/2016 | Zhang .................. H04B 7/0456 |

(Continued)

FOREIGN PATENT DOCUMENTS

| CN | 103621000 | 3/2014 |
| CN | 103795450 | 5/2014 |

(Continued)

OTHER PUBLICATIONS

International Search Report dated May 6, 2015 in corresponding International Application No. PCT/CN2014/083242.

(Continued)

*Primary Examiner* — Khanh C Tran
(74) *Attorney, Agent, or Firm* — Staas & Halsey LLP

(57) ABSTRACT

The present invention discloses a method for feeding back channel state information, a method for receiving channel state information, and a device. The method includes: selecting, by a terminal, a precoding matrix from a preset codebook subset for each subband in N subbands according to a configured reference signal, where each precoding matrix in the codebook subset is identified by a first PMI, a second PMI, and a third PMI that is used to indicate a phase relationship, first PMIs corresponding to the precoding matrices selected by the terminal for all subbands in the N subbands are the same, the precoding matrix selected for each subband in the N subbands corresponds to one second PMI, and third PMIs corresponding to the precoding matrices for all subbands in the N subbands are the same; and reporting, by the terminal, the first PMI, the second PMI, and the third PMI.

16 Claims, 7 Drawing Sheets

(51) Int. Cl.
*H04L 5/00* (2006.01)
*H04J 11/00* (2006.01)

(58) Field of Classification Search
CPC ........ H04B 7/0617; H04B 7/024; H04B 7/06;
H04L 1/0026; H04L 5/0048; H04J 11/00
See application file for complete search history.

(56) References Cited

U.S. PATENT DOCUMENTS

| | | | |
|---|---|---|---|
| 9,419,765 B2* | 8/2016 | Yu | H04B 7/0639 |
| 2012/0039251 A1 | 2/2012 | Sayana et al. | |
| 2012/0328035 A1* | 12/2012 | Yoon | H04B 7/0626 |
| | | | 375/260 |
| 2013/0094464 A1* | 4/2013 | Li | H04L 5/0035 |
| | | | 370/329 |
| 2013/0182672 A1* | 7/2013 | Kakishima | H04B 7/065 |
| | | | 370/329 |
| 2014/0016549 A1 | 1/2014 | Novlan et al. | |
| 2014/0112406 A1* | 4/2014 | Zhu | H04B 7/0452 |
| | | | 375/267 |
| 2015/0063488 A1* | 3/2015 | Dinan | H04B 7/0456 |
| | | | 375/267 |
| 2016/0043789 A1 | 2/2016 | Wang et al. | |
| 2017/0195020 A1* | 7/2017 | Ko | H04B 7/0456 |

FOREIGN PATENT DOCUMENTS

| | | |
|---|---|---|
| EP | 2930968 A1 | 10/2015 |
| WO | 2014/088307 A1 | 6/2014 |

OTHER PUBLICATIONS

Extended European Search Report dated Jun. 28, 2017 in corresponding European Patent Application No. 14898825.6.
Alcatel-Lucent Shanghai Bell et al: "Further evaluations on CSI feedback enhancement for x-pol antenna configurations in Scenarios A and C," 3GPP Draft; R1-114059, $3^{rd}$ Generation Partnership Project (3GPP), Mobile Competence Centre; 650, Route Des Lucioles; F-06921 Sophia-Antipolis Cede, vol. Ran WG1, No. San Francisco, USA; Nov. 8, 2011.
International Search Report, dated May 6, 2015, in International Application No. PCT/CN2014/083242 (4 pages).

* cited by examiner

51

A terminal selects a precoding matrix from a preset codebook subset for each subband in N subbands according to a configured reference signal, where each precoding matrix in the codebook subset is identified by a first PMI, a second PMI, and a third PMI that is used to indicate a phase relationship, first PMIs corresponding to the precoding matrices selected by the terminal for all subbands in the N subbands are the same, the precoding matrix selected by the terminal for each subband in the N subbands corresponds to one second PMI, and third PMIs corresponding to the precoding matrices selected by the terminal for all subbands in the N subbands are the same

52

The terminal reports the first PMI, the second PMI, and the third PMI that are corresponding to each selected precoding matrix

A terminal selects a precoding matrix from a preset codebook subset for each subband in N subbands according to a configured reference signal, where each precoding matrix in the codebook subset is identified by a first PMI and a second PMI, the precoding matrices selected by the terminal for all subbands in the N subbands correspond to at least two first PMIs, matrices corresponding to the at least two first PMIs have different phase relationships, and the precoding matrix selected by the terminal for each subband in the N subbands corresponds to one second PMI

62

The terminal reports the first PMI and the second PMI that are corresponding to each selected precoding matrix

FIG. 6

┌─ 71
│ A base station receives a first PMI, a second PMI, and a third PMI that are
│ reported by a terminal, where the third PMI is used to indicate a phase
│ relationship, first PMIs corresponding to precoding matrices selected by the
│ terminal for all subbands in N subbands are the same, a precoding matrix
│ selected by the terminal for each subband in the N subbands corresponds to
│ one second PMI, and third PMIs corresponding to the precoding matrices
│ selected by the terminal for all subbands in the N subbands are the same ┌─ 72
│ The base station determines the precoding matrix corresponding to each
│ subband from a preset codebook subset according to the received first PMI,
│ second PMI, and third PMI, where each precoding matrix in the codebook
│ subset is identified by a first PMI, a second PMI, and a third PMI

FIG. 7

┌─ 81
│ A base station receives a first PMI and a second PMI that are reported by a
│ terminal, where precoding matrices selected by the terminal for all subbands
│ in N subbands correspond to at least two first PMIs, matrices corresponding
│ to the at least two first PMIs have different phase relationships, and a
│ precoding matrix selected by the terminal for each subband in the N
│ subbands corresponds to one second PMI ┌─ 82
│ The base station determines the precoding matrix corresponding to each
│ subband from a preset codebook subset according to the received first PMI
│ and second PMI, where each precoding matrix in the codebook subset is
│ identified by a first PMI and a second PMI

FIG. 8

METHOD FOR FEEDING BACK CHANNEL STATE INFORMATION, METHOD FOR RECEIVING CHANNEL STATE INFORMATION, AND DEVICE

CROSS-REFERENCE TO RELATED APPLICATIONS

This application is a continuation of International Application No. PCT/CN2014/083242, filed on Jul. 29, 2014, the disclosure of which is hereby incorporated by reference in its entirety.

TECHNICAL FIELD

The present invention relates to the field of communications technologies, and in particular, to a method for feeding back channel state information, a method for receiving channel state information, and a device.

BACKGROUND

A multi-antenna multiple-input multiple-output (MIMO) technology has been widely applied in a wireless mobile communications system to improve spectrum efficiency and cell coverage. For example, a Long Term Evolution (LTE) downlink supports transmitting on 2, 4, and 8 antenna ports. To better support downlink transmission on multiple antenna ports, an evolved NodeB (eNB) generally uses a precoding matrix to perform preprocessing or precoding on data that needs to be transmitted, so as to reduce interference between different data streams in single user MIMO (SU-MIMO), or data stream interference between different users in multiple user MIMO (MU-MIMO), and increase a signal to interference plus noise ratio (Signal to Interference and Noise Ratio, SINR) of data.

Information required by preprocessing is based on downlink channel measurement information that is fed back by user equipment (UE). The UE performs channel estimation according to a reference signal transmitted by the eNB, for example, a channel state information reference signal (CSI-RS), and determines CSI according to an estimation result. The CSI includes information such as a transmission rank (that is, a quantity of layers of transmitted data), a precoding matrix, and a channel quality indicator (CQI). Then the UE feeds back the determined CSI to the eNB. The CSI fed back by the UE provides merely a reference for the eNB performing downlink scheduling. Specifically, how to use the CSI fed back by the UE is determined by the eNB.

Generally, for each rank, a specific quantity of precoding matrices is designed for representing quantized channels. The designed precoding matrices form a codebook. Each precoding matrix in the codebook has an identifier, that is, a precoding matrix indicator (PMI). The codebook is predefined, that is, both the eNB end and the UE end store a same codebook, and a correspondence between each precoding matrix and each PMI in the codebook is understood consistently. After the UE selects a precoding matrix from the defined codebook according to the estimated downlink channel, the UE needs only to feed back a PMI corresponding to the selected precoding matrix to the eNB, and the eNB may determine the specific precoding matrix according to the PMI fed back by the UE.

Because a precoding matrix represents channel state information, a codebook design affects system performance. The codebook design is directly related to a specific configuration of a transmit antenna on the eNB side. Using 2, 4, and 8 antenna ports supported in LTE Rel-8/9/10 as an example, during configuration, it is assumed that all the antenna ports are arranged in a same dimension, that is, in a horizontal direction, as shown in FIG. 1A and FIG. 1B. FIG. 1A shows a schematic diagram of a uniform linear array (ULA) arrangement manner of 2 antenna ports and 4 antenna ports. FIG. 1B shows a schematic diagram of a cross polarization arrangement manner of 2 antenna ports, 4 antenna ports, and 8 antenna ports.

Because all the antenna ports are arranged in the horizontal direction, a function of the precoding matrix is to adjust a phase on each antenna port to generate a horizontal beam pointing to the UE. As shown in FIG. 2, 4 beams PMI 1, PMI 2, PMI 3, and PMI 4 serve UE 1, UE 2, UE 3, and UE 4 respectively, so as to increase an SINR of a signal. Such an antenna configuration is suitable for serving users in a cell that are all distributed on a same horizontal plane (for example, all users are distributed on the ground). By using multiple different precoding matrices, the eNB can simultaneously generate multiple beams in different directions to serve different UEs in a MU-MIMO manner.

However, in a practical environment, UEs in a cell are generally distributed in two dimensions: in a horizontal direction and in a vertical direction. For example, UEs in a cell are distributed in different buildings and on different floors of a same building. Because the current antenna port configuration can control a beam direction only in the horizontal direction, UEs at different heights in the vertical direction cannot be better served. Currently, due to development of an AAS technology, transmit antennas or antenna ports on the eNB side can be easily arranged in the two dimensions: in the horizontal direction and in the vertical direction. Antenna ports in the same horizontal direction can control the horizontal direction of the beam as before (for example, antenna ports 0, 1, 4, and 5, or antenna ports 2, 3, 6, and 7 in FIG. 3). At the same time, antenna ports in different rows can control the vertical direction of the beam (for example, the vertical direction of the beam may be controlled by combining the antenna ports (0, 1, 4, and 5) and the antenna ports (2, 3, 6, and 7) in FIG. 4). The two-dimensional antenna port configuration can freely control the horizontal and vertical directions of the beam to serve more UEs, as shown in FIG. 4.

However, in the current LTE system, all precoding matrices are designed for antenna ports that are all arranged in the horizontal direction, and can generate only the horizontal beams. When the antenna ports are distributed in a two-dimensional manner, the existing precoding matrices cannot control beam directions in horizontal and vertical directions simultaneously. Therefore, the existing precoding matrices cannot control beams in horizontal and vertical directions.

SUMMARY

Embodiments of the present invention provide a method for feeding back channel state information, a method for receiving channel state information, and a device to resolve a problem that an existing precoding matrix is unable to control a beam in horizontal and vertical directions.

According to a first aspect, a first terminal device is provided, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the terminal device includes:

a precoding matrix selection module, configured to select a precoding matrix from a preset codebook subset for each subband in the N subbands according to a configured reference signal, where each precoding matrix in the codebook subset is identified by a first precoding matrix indicator PMI, a second PMI, and a third PMI that is used to indicate a phase relationship, first PMIs corresponding to the precoding matrices selected by the precoding matrix selection module for all subbands in the N subbands are the same, the precoding matrix selected by the precoding matrix selection module for each subband in the N subbands corresponds to one second PMI, and third PMIs corresponding to the precoding matrices selected by the precoding matrix selection module for all subbands in the N subbands are the same; and a reporting module, configured to report the first PMI, the second PMI, and the third PMI that are corresponding to each precoding matrix selected by the precoding matrix selection module.

With reference to the first aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the first aspect or the first possible implementation manner of the first aspect, in a second possible implementation manner, the third PMI is one phase value selected from the preconfigured phase set; or the third PMI is a phase vector that includes at least two phase values, where the at least two phase values are selected from the preconfigured phase set.

With reference to the first aspect, the first possible implementation manner of the first aspect, or the second possible implementation manner of the first aspect, in a third possible implementation manner, the first PMI is a first precoding matrix index number of the precoding matrix in the codebook defined for the antenna ports whose quantity is greater than 4 in the LTE Rel-10 and later releases.

With reference to the third possible implementation manner of the first aspect, in a fourth possible implementation manner, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the precoding matrix selection module from the third PMI for a subband corresponding to the second PMI, and the second information is a second precoding matrix index number of the precoding matrix in the codebook defined for the antenna ports whose quantity is greater than 4 in the LTE Rel-10 and later releases.

With reference to the first aspect, the second possible implementation manner of the first aspect, the third possible implementation manner of the first aspect, or the fourth possible implementation manner of the first aspect, in a fifth possible implementation manner, the some or all of the precoding matrices in the codebook subset are denoted by:

$$W = f(W_1, \beta) W_2,$$

where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:,1) \ \ldots \ \ldots \ D_{k,m}(\beta) X_k(:,m)]$, $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

According to a second aspect, a second terminal device is provided, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the terminal device includes:

a precoding matrix selection module, configured to select a precoding matrix from a preset codebook subset for each subband in the N subbands according to a configured reference signal, where each precoding matrix in the codebook subset is identified by a first precoding matrix indicator PMI and a second PMI, the precoding matrices selected by the precoding matrix selection module for all subbands in the N subbands correspond to at least two first PMIs, matrices corresponding to the at least two first PMIs have different phase relationships, and the precoding matrix selected by the precoding matrix selection module for each subband in the N subbands corresponds to one second PMI; and a reporting module, configured to report the first PMI and the second PMI that are corresponding to each precoding matrix selected by the precoding matrix selection module.

With reference to the second aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the second aspect or the first possible implementation manner of the second aspect, in a second possible implementation manner, the second PMI includes first information and second information, the first information is used to indicate a first PMI selected by the precoding matrix selection module from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

With reference to the second aspect, the first possible implementation manner of the second aspect, or the second possible implementation manner of the second aspect, in a third possible implementation manner, the some or all of the precoding matrices in the codebook subset are denoted by:

$$W = W_1 W_2,$$

where $W_1 \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$ $X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

According to a third aspect, a third terminal device is provided, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the terminal device includes:

a processor, configured to select a precoding matrix from a preset codebook subset for each subband in the N subbands according to a configured reference signal, where each precoding matrix in the codebook subset is identified by a first precoding matrix indicator PMI, a second PMI, and a third PMI that is used to indicate a phase relationship, first PMIs corresponding to the precoding matrices selected by the processor for all subbands in the N subbands are the same, the precoding matrix selected by the processor for each subband in the N subbands corresponds to one second PMI, and third PMIs corresponding to the precoding matrices selected by the processor for all subbands in the N subbands are the same; and a transmitter, configured to report the first PMI, the second PMI, and the third PMI that are corresponding to each precoding matrix selected by the processor.

With reference to the third aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the third aspect or the first possible implementation manner of the third aspect, in a second possible implementation manner, the third PMI is one phase value selected from the preconfigured phase set; or the third PMI is a phase vector that includes at least two phase values, where the at least two phase values are selected from the preconfigured phase set.

With reference to the third aspect, the first possible implementation manner of the third aspect, or the second possible implementation manner of the third aspect, in a third possible implementation manner, the first PMI is a first precoding matrix index number of the precoding matrix in the codebook defined for the antenna ports whose quantity is greater than 4 in the LTE Rel-10 and later releases.

With reference to the third possible implementation manner of the third aspect, in a fourth possible implementation manner, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the processor from the third PMI for a subband corresponding to the second PMI, and the second information is a second precoding matrix index number of the precoding matrix in the codebook defined for the antenna ports whose quantity is greater than 4 in the LTE Rel-10 and later releases.

With reference to the third aspect, the second possible implementation manner of the third aspect, the third possible implementation manner of the third aspect, or the fourth possible implementation manner of the third aspect, in a fifth possible implementation manner, the some or all of the precoding matrices in the codebook subset are denoted by:

$$W = f(W_1, \beta) W_2,$$

where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:, 1) \ldots \ldots D_{k,m}(\beta) X_k(:, m)],$ $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

According to a fourth aspect, a fourth terminal device is provided, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the terminal device includes:

a processor, configured to select a precoding matrix from a preset codebook subset for each subband in the N subbands according to a configured reference signal, where each precoding matrix in the codebook subset is identified by a first precoding matrix indicator PMI and a second PMI, the precoding matrices selected by the processor for all subbands in the N subbands correspond to at least two first PMIs, matrices corresponding to the at least two first PMIs have different phase relationships, and the precoding matrix selected by the processor for each subband in the N subbands corresponds to one second PMI; and a transmitter, configured to report the first PMI and the second PMI that are corresponding to each precoding matrix selected by the processor.

With reference to the fourth aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the fourth aspect or the first possible implementation manner of the fourth aspect, in a second possible implementation manner, the second PMI includes first information and second information, the first information is used to indicate a first PMI selected by the processor from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

With reference to the fourth aspect, the first possible implementation manner of the fourth aspect, or the second possible implementation manner of the fourth aspect, in a third possible implementation manner, the some or all of the precoding matrices in the codebook subset are denoted by:

$$W = W_1 W_2,$$

where $W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$ $X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

According to a fifth aspect, a first base station device is provided, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the base station device includes:

a receiving module, configured to receive a first precoding matrix indicator PMI, a second PMI, and a third PMI that are reported by a terminal, where the third PMI is used to indicate a phase relationship, first PMIs corresponding to precoding matrices selected by the terminal for all subbands in the N subbands are the same, a precoding matrix selected by the terminal for each subband in the N subbands corresponds to one second PMI, and third PMIs corresponding to the precoding matrices selected by the terminal for all subbands in the N subbands are the same; and a precoding matrix determining module, configured to determine the precoding matrix corresponding to each subband from a preset codebook subset according to the received first PMI, second PMI, and third PMI, where each precoding matrix in the codebook subset is identified by a first PMI, a second PMI, and a third PMI.

With reference to the fifth aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the fifth aspect or the first possible implementation manner of the fifth aspect, in a second possible implementation manner, the third PMI is one phase value selected from the preconfigured phase set; or the third PMI is a phase vector that includes at least two phase values, where the at least two phase values are selected from the preconfigured phase set.

With reference to the fifth aspect, the first possible implementation manner of the fifth aspect, or the second possible implementation manner of the fifth aspect, in a third possible implementation manner, the first PMI is a first precoding matrix index number of the precoding matrix in the codebook defined for the antenna ports whose quantity is greater than 4 in the LTE Rel-10 and later releases.

With reference to the second possible implementation manner of the fifth aspect, in a fourth possible implementation manner, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the terminal from the third PMI for a subband corresponding to the second PMI, and the second information is a second precoding matrix index number of the precoding matrix in the codebook defined for the antenna ports whose quantity is greater than 4 in the LTE Rel-10 and later releases.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a fifth possible implementation manner, the precoding matrix that is corresponding to each subband and determined by the precoding matrix determining module is denoted by:

$$W = f(W_1, \beta) W_2,$$

where β denotes the phase value corresponding to the third PMI, $\beta \in \{\beta_0, \beta_1, \ldots, \beta_{L-1}\}$ and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta)X_k(:,1) \ldots \ldots D_{k,m}(\beta)X_k(:,m)]$, $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi\frac{2(2k+(m-1))}{32}}} & 0 \\ 0 & 0 & 0 & \dfrac{\beta}{e^{j2\pi\frac{2(2k+(m-1))}{32}}} \end{bmatrix}.$$

According to a sixth aspect, a second base station device is provided, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the base station device includes:

a receiving module, configured to receive a first precoding matrix indicator PMI and a second PMI that are reported by a terminal, where precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI; and a precoding matrix determining module, configured to determine the precoding matrix corresponding to each subband from a preset codebook subset according to the received first PMI and second PMI, where each precoding matrix in the codebook subset is identified by a first PMI and a second PMI.

With reference to the sixth aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the sixth aspect or the first possible implementation manner of the sixth aspect, in a second possible implementation manner, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

With reference to the sixth aspect, the first possible implementation manner of the sixth aspect, or the second possible implementation manner of the sixth aspect, in a third possible implementation manner, the precoding matrix that is corresponding to each subband and determined by the precoding matrix determining module is denoted by:

$$W = W_1 W_2,$$

where $W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix}$, $X_k$ denotes a DFT column vector, β denotes a phase value in the configured phase set, $\beta \in \{\beta_0, \beta_1, \ldots, \beta_{L-1}\}$ and L is a positive integer; and $W_2$ is a matrix corresponding to the second precoding matrix index number of the precoding matrix in the codebook defined for the antenna ports whose quantity is greater than 4 in the LTE Rel-10 and later releases.

According to a seventh aspect, a third base station device is provided, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the base station device includes:

a receiver, configured to receive a first precoding matrix indicator PMI, a second PMI, and a third PMI that are reported by a terminal, where the third PMI is used to indicate a phase relationship, first PMIs corresponding to precoding matrices selected by the terminal for all subbands in the N subbands are the same, a precoding matrix selected by the terminal for each subband in the N subbands corresponds to one second PMI, and third PMIs corresponding to the precoding matrices selected by the terminal for all subbands in the N subbands are the same; and a processor, configured to determine the precoding matrix corresponding to each subband from a preset codebook subset according to the received first PMI, second PMI, and third PMI, where each precoding matrix in the codebook subset is identified by a first PMI, a second PMI, and a third PMI.

With reference to the seventh aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the seventh aspect or the first possible implementation manner of the seventh aspect, in a second possible implementation manner, the third PMI is one phase value selected from the preconfigured phase set; or the third PMI is a phase vector that includes at least two phase values, where the at least two phase values are selected from the preconfigured phase set.

With reference to the seventh aspect, the first possible implementation manner of the seventh aspect, or the second possible implementation manner of the seventh aspect, in a third possible implementation manner, the first PMI is a first precoding matrix index number of the precoding matrix in the codebook defined for the antenna ports whose quantity is greater than 4 in the LTE Rel-10 and later releases.

With reference to the second possible implementation manner of the seventh aspect, in a fourth possible implementation manner, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the terminal from the third PMI for a subband corresponding to the second PMI, and the second information is a second precoding matrix index number of the precoding matrix in the codebook defined for the antenna ports whose quantity is greater than 4 in the LTE Rel-10 and later releases.

With reference to the seventh aspect, the first possible implementation manner of the seventh aspect, the second possible implementation manner of the seventh aspect, the third possible implementation manner of the seventh aspect, or the fourth possible implementation manner of the seventh aspect, in a fifth possible implementation manner, the precoding matrix that is corresponding to each subband and determined by the processor is denoted by:

$$W = f(W_1, \beta)W_2,$$

where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta)X_k(:,1) \ldots \ldots D_{k,m}(\beta)X_k(:,m)]$, $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi\frac{2(2k+(m-1))}{32}}} & 0 \\ 0 & 0 & 0 & \dfrac{\beta}{e^{j2\pi\frac{2(2k+(m-1))}{32}}} \end{bmatrix}.$$

According to an eighth aspect, a fourth base station device is provided, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1, where the base station device includes:

a receiver, configured to receive a first precoding matrix indicator PMI and a second PMI that are reported by a terminal, where precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI; and a processor, configured to determine the precoding matrix corresponding to each subband from a preset codebook subset according to the received first PMI and second PMI, where each precoding matrix in the codebook subset is identified by a first PMI and a second PMI.

With reference to the eighth aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the eighth aspect or the first possible implementation manner of the eighth aspect, in a second possible implementation manner, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

With reference to the eighth aspect, the first possible implementation manner of the eighth aspect, or the second possible implementation manner of the eighth aspect, in a third possible implementation manner, the precoding matrix that is corresponding to each subband and determined by the processor is denoted by:

$$W = W_1 W_2,$$

where $W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix}$, $X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

According to a ninth aspect, a method for feeding back channel state information in a wireless communications system is provided, where the wireless communications system is a multicarrier system, M subcarriers exist in and N subbands are defined in the wireless communications system, a quantity of subcarriers in each subband is greater than 1, and both M and N are positive integers greater than 1, where the method includes:

selecting, by a terminal, a precoding matrix from a preset codebook subset for each subband in the N subbands according to a configured reference signal, where each precoding matrix in the codebook subset is identified by a first precoding matrix indicator PMI, a second PMI, and a third PMI that is used to indicate a phase relationship, first PMIs corresponding to the precoding matrices selected by the terminal for all subbands in the N subbands are the same, the precoding matrix selected by the terminal for each subband in the N subbands corresponds to one second PMI, and third PMIs corresponding to the precoding matrices selected by the terminal for all subbands in the N subbands are the same; and reporting, by the terminal, the first PMI, the second PMI, and the third PMI that are corresponding to each selected precoding matrix.

With reference to the ninth aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the ninth aspect or the first possible implementation manner of the ninth aspect, in a second possible implementation manner, the third PMI is one phase value selected from the preconfigured phase set; or the third PMI is a phase vector that includes at least two phase values, where the at least two phase values are selected from the preconfigured phase set.

With reference to the ninth aspect, the first possible implementation manner of the ninth aspect, or the second possible implementation manner of the ninth aspect, in a third possible implementation manner, the first PMI is a first precoding matrix index number of the precoding matrix in the codebook defined for the antenna ports whose quantity is greater than 4 in the LTE Rel-10 and later releases.

With reference to the second possible implementation manner of the ninth aspect, in a fourth possible implementation manner, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the terminal from the third PMI for a subband corresponding to the second PMI, and the second information is a second precoding matrix index number of the precoding matrix in the codebook defined for the antenna ports whose quantity is greater than 4 in the LTE Rel-10 and later releases.

With reference to the ninth aspect, the first possible implementation manner of the ninth aspect, the second possible implementation manner of the ninth aspect, the third possible implementation manner of the ninth aspect, or the fourth possible implementation manner of the ninth aspect, in a fifth possible implementation manner, the some or all of the precoding matrices in the codebook subset are denoted by:

$W = f(W_1, \beta) W_2,$ where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:,1) \ldots \ldots D_{k,m}(\beta) X_k(:,m)],$ $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

According to a tenth aspect, a method for feeding back channel state information in a wireless communications system is provided, where the wireless communications system is a multicarrier system, M subcarriers exist in and N subbands are defined in the wireless communications system, a quantity of subcarriers in each subband is greater than 1, and both M and N are positive integers greater than 1, where the method includes:

selecting, by a terminal, a precoding matrix from a preset codebook subset for each subband in the N subbands according to a configured reference signal, where each precoding matrix in the codebook subset is identified by a first precoding matrix indicator PMI and a second PMI, the precoding matrices selected by the terminal for all subbands in the N subbands correspond to at least two first PMIs, matrices corresponding to the at least two first PMIs have different phase relationships, and the precoding matrix selected by the terminal for each subband in the N subbands corresponds to one second PMI; and reporting, by the terminal, the first PMI and the second PMI that are corresponding to each selected precoding matrix.

With reference to the tenth aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the tenth aspect or the first possible implementation manner of the tenth aspect, in a second possible implementation manner, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

With reference to the tenth aspect, the first possible implementation manner of the tenth aspect, or the second possible implementation manner of the tenth aspect, in a third possible implementation manner, the some or all of the precoding matrices in the codebook subset are denoted by:

$$W = W_1 W_2,$$

$$\text{where } W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

According to an eleventh aspect, a method for receiving channel state information in a wireless communications system is provided, where the wireless communications system is a multicarrier system, M subcarriers exist in and N subbands are defined in the wireless communications system, a quantity of subcarriers in each subband is greater than 1, and both M and N are positive integers greater than 1, where the method includes:

receiving, by a base station, a first precoding matrix indicator PMI, a second PMI, and a third PMI that are reported by a terminal, where the third PMI is used to indicate a phase relationship, first PMIs corresponding to precoding matrices selected by the terminal for all subbands in the N subbands are the same, a precoding matrix selected by the terminal for each subband in the N subbands corresponds to one second PMI, and third PMIs corresponding to the precoding matrices selected by the terminal for all subbands in the N subbands are the same; and determining, by the base station, the precoding matrix corresponding to each subband from a preset codebook subset according to the received first PMI, second PMI, and third PMI, where each precoding matrix in the codebook subset is identified by a first PMI, a second PMI, and a third PMI.

With reference to the eleventh aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the eleventh aspect or the first possible implementation manner of the eleventh aspect, in a second possible implementation manner, the third PMI is one phase value selected from the preconfigured phase set; or the third PMI is a phase vector that includes at least two phase values, where the at least two phase values are selected from the preconfigured phase set.

With reference to the eleventh aspect, the first possible implementation manner of the eleventh aspect, or the second possible implementation manner of the eleventh aspect, in a third possible implementation manner, the first PMI is a first precoding matrix index number of the precoding matrix in the codebook defined for the antenna ports whose quantity is greater than 4 in the LTE Rel-10 and later releases.

With reference to the second possible implementation manner of the eleventh aspect, in a fourth possible implementation manner, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the terminal from the third PMI for a subband corresponding to the second PMI, and the second information is a second precoding matrix index number of the precoding matrix in the codebook defined for the antenna ports whose quantity is greater than 4 in the LTE Rel-10 and later releases.

With reference to the eleventh aspect, the first possible implementation manner of the eleventh aspect, the second possible implementation manner of the eleventh aspect, the third possible implementation manner of the eleventh aspect, or the fourth possible implementation manner of the eleventh aspect, in a fifth possible implementation manner, the precoding matrix that is corresponding to each subband and determined by the base station is denoted by:

$$W = f(W_1, \beta) W_2,$$

where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:, 1) \ldots \ldots D_{k,m}(\beta) X_k(:, m)],$ $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

According to a twelfth aspect, a method for receiving channel state information in a wireless communications system is provided, where the wireless communications system is a multicarrier system, M subcarriers exist in and N subbands are defined in the wireless communications system, a quantity of subcarriers in each subband is greater than 1, and both M and N are positive integers greater than 1, where the method includes:

receiving, by a base station, a first precoding matrix indicator PMI and a second PMI that are reported by a terminal, where precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI; and determining, by the base station, the precoding matrix corresponding to each subband from a preset codebook subset according to the received first PMI and second PMI, where each precoding matrix in the codebook subset is identified by a first PMI and a second PMI.

With reference to the twelfth aspect, in a first possible implementation manner, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

With reference to the twelfth aspect or the first possible implementation manner of the twelfth aspect, in a second possible implementation manner, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

With reference to the twelfth aspect, the first possible implementation manner of the twelfth aspect, or the second possible implementation manner of the twelfth aspect, in a third possible implementation manner, the precoding matrix that is corresponding to each subband and determined by the base station is denoted by:

$W = W_1 W_2,$ where $W_1 = \begin{bmatrix} \tilde{X}_k & 0 \\ 0 & \tilde{X}_k \end{bmatrix}$, $k = 0, 1, \ldots, 15$, $\tilde{X}_k = \begin{bmatrix} X_k \\ \beta X_k \end{bmatrix}$, $X_k$ denotes a DFT column vector, β denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

In the method and device provided in the embodiments of the present invention, the precoding matrix selected by the terminal for each subband in the N subbands in the wireless communications system is identified by the first PMI, the second PMI, and the third PMI that is used to indicate the phase relationship, and because the third PMI that is used to indicate the phase relationship is introduced, precoding matrices selected for different subbands can control a beam in both horizontal and vertical directions simultaneously; or because the precoding matrices selected by the terminal for all subbands in the N subbands correspond to at least two first PMIs, and the matrices corresponding to the at least two first PMIs have different phase relationships, so that precoding matrices selected by the terminal for different subbands can control a beam in both horizontal and vertical directions.

BRIEF DESCRIPTION OF DRAWINGS

FIG. 5 is a schematic flowchart of a first method for feeding back channel state information in a wireless communications system according to the present invention;

FIG. 6 is a schematic flowchart of a second method for feeding back channel state information in a wireless communications system according to the present invention;

FIG. 7 is a schematic flowchart of a first method for receiving channel state information in a wireless communications system according to the present invention;

FIG. 8 is a schematic flowchart of a second method for receiving channel state information in a wireless communications system according to the present invention;

DESCRIPTION OF EMBODIMENTS

Figure 1A:
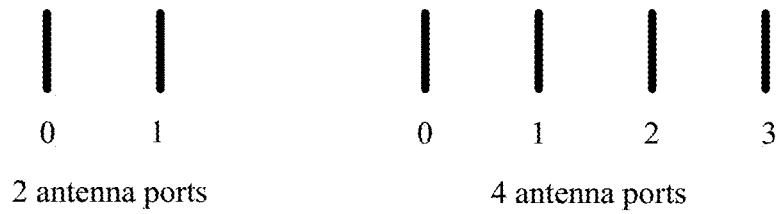
FIG. 1A is a schematic diagram of a uniform linear array arrangement manner of 2 antenna ports and 4 antenna ports in an LTE system.
Figure 1B:
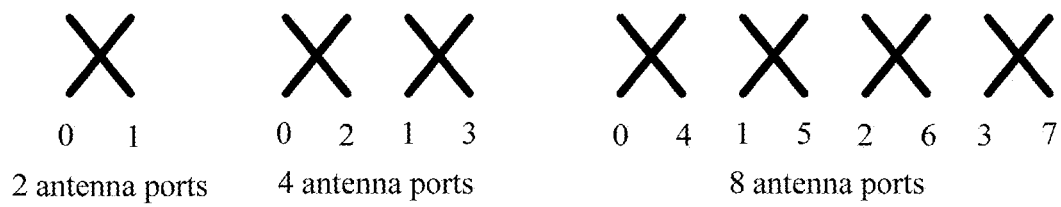
FIG. 1B is a schematic diagram of a cross polarization arrangement manner of 2 antenna ports, 4 antenna ports, and 8 antenna ports in an LTE system.
Figure 2:
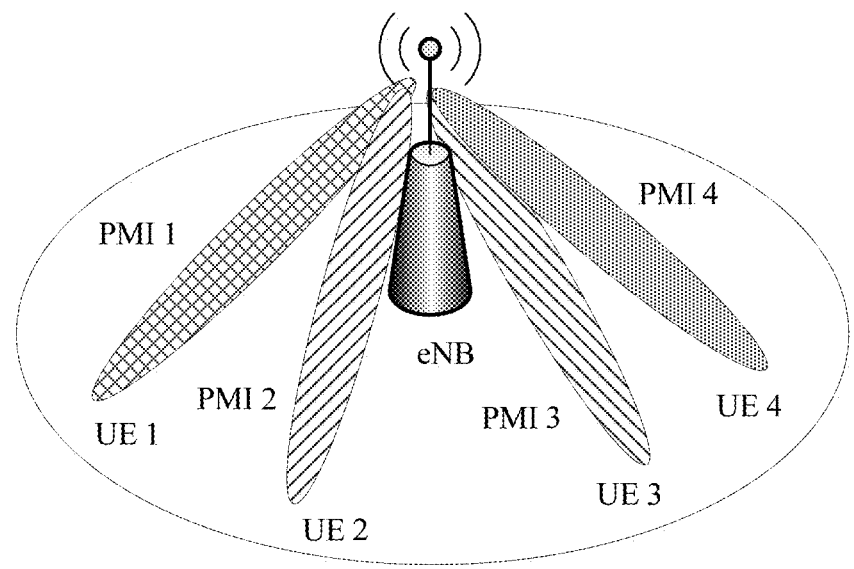
FIG. 2 is a schematic diagram of horizontal beams corresponding to different precoding matrices in an LTE system.
Figure 3:
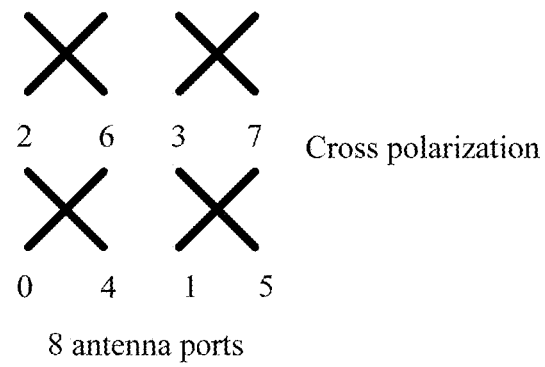
FIG. 3 is a schematic diagram of horizontal and vertical two-dimensional antenna configuration in an LTE system.
Figure 4:
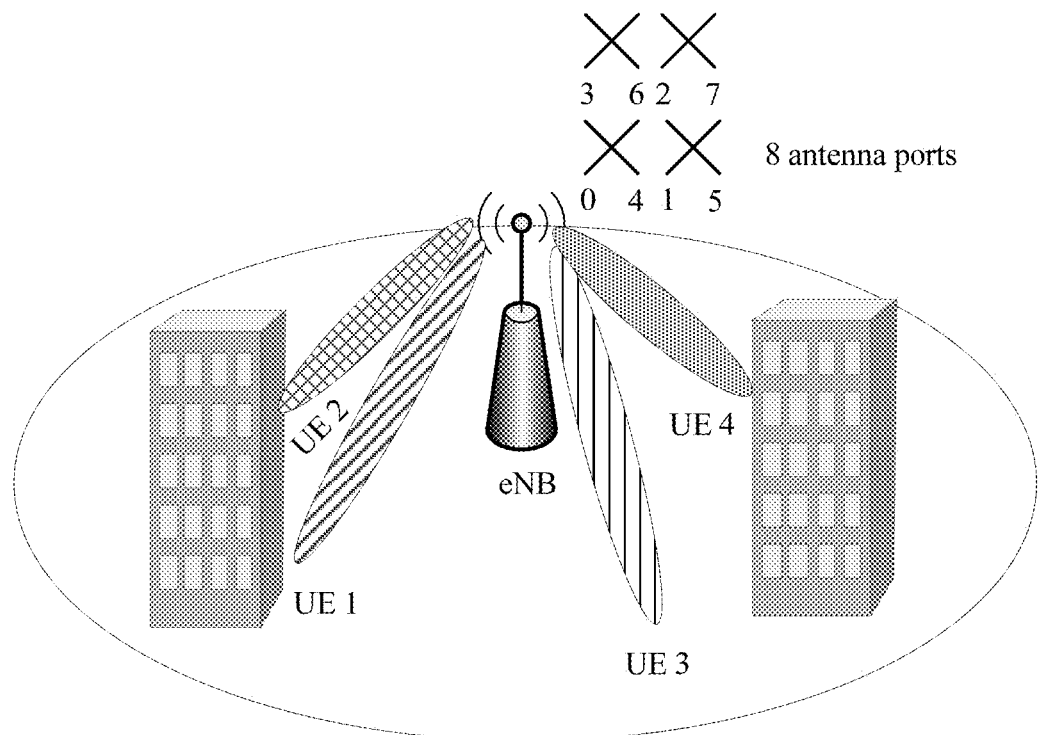
FIG. 4 is a schematic diagram of a beam formed by a two-dimensional antenna port configuration in an LTE system.

In the embodiments of the present invention, some or all of precoding matrices in a codebook defined for antenna ports whose quantity is greater than 4 in an LTE release Rel-10 and later releases are processed, so that different precoding matrices have different phases, and obtained precoding matrices can control a beam in horizontal and vertical directions.

Technical solutions provided in the present invention are applicable to an LTE system and an evolved system of the LTE system (such as an LTE-A system).

A terminal in the present invention may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal (Mobile), a remote station, an access point, a remote terminal, an access terminal, a user terminal, a user agent, a user device, or user equipment.

A base station (for example, an access point) in the present invention may refer to a device in communication with a wireless terminal via one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be an evolved NodeB (NodeB or eNB or e-NodeB, evolutional Node B) in LTE.

First, a precoding matrix in a codebook defined for antenna ports whose quantity is greater than 4 in the LTE release Rel-10 is described. Each precoding matrix in the codebook is identified by a first precoding matrix index number and a second precoding matrix index number. For details, refer to the 3GPP TS76.213 protocol.

For example, a precoding matrix whose rank is 1 in a codebook defined for 8 antenna ports in the LTE release Rel-10 is shown in the following table.

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | | | | $i_2$ | | | | |
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

$$W_{m,n}^{(1)} = \frac{1}{\sqrt{8}} \begin{bmatrix} v_m \\ \varphi_n v_m \end{bmatrix}$$

In the table, $$\begin{cases} \varphi_n = e^{j\pi n/2} \\ v_m = [\, 1 \quad e^{j2\pi m/32} \quad e^{j4\pi m/32} \quad e^{j6\pi m/32} \,]^T \end{cases},$$

where $i_1$ and $i_2$ are a first precoding matrix index number and a second precoding matrix index number respectively.

It can be deduced from the foregoing table that the precoding matrix in the codebook defined for 8 antenna ports in the LTE release Rel-10 may be denoted by:

$$W_{Rel-10,8} = W_1^* W_2^*,$$

where $W_1^*$ may be construed as a matrix corresponding to the first precoding matrix index number of the precoding matrix defined for the 8 antenna ports in the LTE release Rel-10, $$W_1^* = \begin{bmatrix} X & 0 \\ 0 & X \end{bmatrix},$$

X is a 4×Q matrix including different Q values and discrete Fourier transform (DFT) column vectors whose lengths are all 4, and Q is a positive integer greater than 1 and denotes a quantity of DFT vectors; and $W_2^*$ may be construed as a matrix corresponding to the second precoding matrix index number of the precoding matrix defined for the 8 antenna ports in the LTE release Rel-10, $$W_2^* = \begin{bmatrix} Y \\ \alpha Y \end{bmatrix},$$

Y is a column selection matrix, r columns are selected from the matrix X, r is the rank of the matrix $W_{Rel-10,8}$, and α is an adjustment value of phase adjustment performed for each selected column.

The following gives further detailed description of the embodiments of the present invention with reference to the accompanying drawings of the specification. It should be understood that the embodiments described herein are merely used to describe and interpret the present invention but are not intended to limit the present invention.

As shown in FIG. 5, an embodiment of the present invention provides a first method for feeding back channel state information in a wireless communications system, where the wireless communications system is a multicarrier system, M subcarriers exist in and N subbands are defined in the wireless communications system, a quantity of subcarriers in each subband is greater than 1, and both M and N are positive integers greater than 1, where the method includes the following steps:

S51. A terminal selects a precoding matrix from a preset codebook subset for each subband in the N subbands according to a configured reference signal, where each precoding matrix in the codebook subset is identified by a first PMI, a second PMI, and a third PMI that is used to indicate a phase relationship, first PMIs corresponding to the precoding matrices selected by the terminal for all subbands in the N subbands are the same, the precoding matrix selected by the terminal for each subband in the N subbands corresponds to one second PMI, and third PMIs corresponding to the precoding matrices selected by the terminal for all subbands in the N subbands are the same.

Specifically, the reference signal mentioned in S51 is preconfigured. The terminal performs channel estimation according to the reference signal, and selects a precoding matrix from the preset codebook subset for each subband in the N subbands according to a specified criterion, and reports each precoding matrix to the base station for reference. The specified criterion may be a maximum channel capacity criterion, or a maximum transport block size (Transport Block Size, TBS) criterion or the like. The present invention does not limit a manner of selecting a precoding matrix from the preset codebook subset by the terminal for each subband in the N subbands.

S52. The terminal reports the first PMI, the second PMI, and the third PMI that are corresponding to each selected precoding matrix.

In this embodiment of the present invention, the precoding matrix selected by the terminal for each subband in the N subbands in the wireless communications system is identified by the first PMI, the second PMI, and the third PMI that is used to indicate the phase relationship, and because the third PMI that is used to indicate the phase relationship is introduced, precoding matrices selected for different subbands can control a beam in both horizontal and vertical directions simultaneously.

In this embodiment of the present invention, some or all of the precoding matrices in the codebook subset mentioned in S51 are obtained by means of transformation according to a precoding matrix in a first codebook and a phase value in a preconfigured phase set, where the first codebook is a codebook defined for antenna ports whose quantity is greater than 4 in an LTE release Rel-10 and later releases.

Based on any of the foregoing embodiments, the third PMI may be specifically indicated in the following two preferred manners:

Manner 1: The third PMI is one phase value selected from the preconfigured phase set.

In this manner, preferably, the first PMI is a first precoding matrix index number (that is, $i_1$) of the precoding matrix in the codebook defined for the antenna ports whose quantity is greater than 4 in the LTE Rel-10 and later releases.

Preferably, the second PMI is a second precoding matrix index number (that is, $i_2$) of the precoding matrix in the codebook defined for the antenna ports whose quantity is greater than 4 in the LTE Rel-10 and later releases.

Manner 2: The third PMI is a phase vector that includes at least two phase values, where the at least two phase values are selected from the preconfigured phase set.

In this manner, preferably, the first PMI is a first precoding matrix index number (that is, $i_1$) of the precoding matrix in the codebook defined for the antenna ports whose quantity is greater than 4 in the LTE Rel-10 and later releases.

Preferably, the second PMI includes first information and second information, the first information is used to indicate a phase value selected by the terminal from the third PMI for a subband corresponding to the second PMI, and the second information is a second precoding matrix index number ($i_2$) of the precoding matrix in the codebook defined for the antenna ports whose quantity is greater than 4 in the LTE Rel-10 and later releases. That is, for the precoding matrix selected by the terminal for each subband, the first information in the second PMI denotes the phase value in the third PMI corresponding to the precoding matrix, and the second information is the second precoding matrix index number of the precoding matrix in the codebook defined for the antenna ports whose quantity is greater than 4 in the LTE Rel-10 and later releases.

Based on any of the foregoing preferred manners, the preconfigured phase set includes L elements, each element corresponds to a different phase value, and L is a positive integer. Preferably, phase spacings between every two adjacent phase values in the phase set are the same, thereby ensuring that a channel is uniformly quantized. For example, a phase set is $\{1\ j\ -1\ -j\}$, and a spacing between two adjacent phases is $$\frac{\pi}{2}.$$

For another example, a phase set is $$\{e^{j\frac{2\pi l}{L}}, l = 0, 1, \ldots, L-1\},$$

and a spacing between two adjacent phases is $$\frac{2\pi}{L}.$$

Certainly, phase spacings between every two adjacent phase values in the phase set may be different. That is, phases in the phase set are non-uniformly distributed. For example, a phase set is $$\left\{1\ \frac{1+j}{\sqrt{2}}\ -1\ -j\right\},$$

and all phases in the phase set are non-uniformly distributed.

Based on any of the foregoing embodiments, preferably, the some or all of the precoding matrices in the codebook subset are denoted by:

$$W = f(W_1, \beta)W_2 \qquad \text{Formula 1,}$$

where β denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix},$$

$k = 0, 1, \ldots, 15,$ where $\tilde{X}_k = [\, D_{k,1}(\beta)X_k(:,1) \ \ldots \ \ldots \ D_{k,m}(\beta)X_k(:,m)\,],$ $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

In Formula 1, $X_k = [b_{2k} \ b_{2k+1} \ b_{2k+2} \ b_{2k+3}]$, $B = [b_0 \ b_1 \ \ldots \ b_{31}]$, $$B_{1+m, 1+n} = e^{j\frac{2\pi mn}{32}},$$

and m=0, 1, 2, 3, n=0, 1, ..., 31.

In Formula 1, if a rank of the precoding matrix is 1, $$W_2 = \frac{1}{\sqrt{2}} \begin{bmatrix} Y \\ \varphi Y \end{bmatrix},$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\},$$

$\varphi \in \{1 \ j \ -1 \ -j\}.$

If the rank of the precoding matrix is 2, $$W_2 \in \left\{ \frac{1}{\sqrt{2}} \begin{bmatrix} Y_1 & Y_2 \\ Y_1 & -Y_2 \end{bmatrix}, \ \frac{1}{\sqrt{2}} \begin{bmatrix} Y_1 & Y_2 \\ jY_1 & -jY_2 \end{bmatrix} \right\};$$

$(Y_1 \ Y_2) \in$ $\{(\tilde{e}_1 \ \tilde{e}_1) \ (\tilde{e}_2 \ \tilde{e}_2) \ (\tilde{e}_3 \ \tilde{e}_3) \ (\tilde{e}_4 \ \tilde{e}_4) \ (\tilde{e}_1 \ \tilde{e}_2) \ (\tilde{e}_2 \ \tilde{e}_3) \ (\tilde{e}_1 \ \tilde{e}_4) \ (\tilde{e}_2 \ \tilde{e}_4)\};$ $$\tilde{e}_1 = \begin{bmatrix} 1 \\ 0 \\ 0 \\ 0 \end{bmatrix}, \tilde{e}_2 = \begin{bmatrix} 0 \\ 1 \\ 0 \\ 0 \end{bmatrix}, \tilde{e}_3 = \begin{bmatrix} 0 \\ 0 \\ 1 \\ 0 \end{bmatrix}, \tilde{e}_4 = \begin{bmatrix} 0 \\ 0 \\ 0 \\ 1 \end{bmatrix}.$$

With reference to Manner 1 and Manner 2 separately, the following describes the first PMI, the second PMI, and the third PMI that are reported by the terminal in this embodiment of the present invention.

(1) For Manner 1, the first PMI is the first precoding matrix index number of the precoding matrix in the codebook defined for the antenna ports whose quantity is greater than 4 in the LTE Rel-10 and later releases, and the second PMI is the second precoding matrix index number of the precoding matrix in the codebook defined for the antenna ports whose quantity is greater than 4 in the LTE Rel-10 and later releases, and the third PMI corresponds to β. According to $W_1$ corresponding to the first PMI and β corresponding to the third PMI, a matrix $f(W_1, β)$ may be obtained, and then the precoding matrix is obtained according to $f(W_1, β)$ and $W_2$ corresponding to the second PMI. Because the first PMIs selected by the terminal for all subbands are the same, and the third PMIs selected by the terminal for all subbands are the same, the precoding matrices on all subbands have the same $f(W_1, β)$, and then the precoding matrix corresponding to each subband may be obtained according to $W_2$ corresponding to each subband.

For example, it is assumed that the rank fed back by the terminal for the precoding matrix is 1, $W_1$ and $W_2$ corresponding to the precoding matrix in the codebook subset are the same as $W_1^*$ and $W_2^*$ of an 8-antenna codebook in the LTE Rel-10 and later releases, a value set of β is $\{1\ j\ -1\ -j\}$, and 5 subbands are defined in the wireless communications system, Therefore, the value of the first PMI fed back by the terminal is 0, and the corresponding $W_1$ is:

$$W_1 = \begin{bmatrix} X_0 & 0 \\ 0 & X_0 \end{bmatrix}, X_0 = \begin{bmatrix} 1 & 1 & 1 & 1 \\ 1 & e^{j2\pi\frac{1}{32}} & e^{j2\pi\frac{2}{32}} & e^{j2\pi\frac{3}{32}} \\ 1 & e^{j2\pi\frac{2}{32}} & e^{j2\pi\frac{4}{32}} & e^{j2\pi\frac{6}{32}} \\ 1 & e^{j2\pi\frac{3}{32}} & e^{j2\pi\frac{6}{32}} & e^{j2\pi\frac{9}{32}} \end{bmatrix}.$$

If the values of the second PMIs fed back by the terminal for all the subbands are 0, 1, 2, 3, and 4 respectively, matrices $W_2$ corresponding to the second PMIs are respectively:

$$W_{2,subband\,1} = \begin{pmatrix} \tilde{e}_1 \\ \tilde{e}_1 \end{pmatrix}, W_{2,subband\,2} = \begin{pmatrix} \tilde{e}_1 \\ j\tilde{e}_1 \end{pmatrix}, W_{2,subband\,3} = \begin{pmatrix} \tilde{e}_1 \\ -\tilde{e}_1 \end{pmatrix},$$

$$W_{2,subband\,4} = \begin{pmatrix} \tilde{e}_1 \\ -j\tilde{e}_1 \end{pmatrix}, W_{2,subband\,5} = \begin{pmatrix} \tilde{e}_2 \\ \tilde{e}_2 \end{pmatrix}.$$

If the value of the third PMI fed back by the terminal is β=1, according to the first PMI, the second PMI, and the third PMI that are fed back by the terminal, the obtained precoding matrix on each subband is:

$$W_{subband\,n} = f(W_1^0, β=1)W_{2,subband\,n}, n=1,2,3,4,5$$

(2) For Manner 2, each element $β_i$, i=0, 1, . . . , I−1 in the vector denoted by the third PMI combines with the matrix $W_1$ corresponding to the first PMI to generate a matrix $f(W_1, β_i)$, thereby generating I(I≥2) matrices. The second PMI of each subband includes two parts of information. The first information is a phase value selected by the terminal for the subband from the I matrices, and the phase value combines with the first PMI to generate an $f(W_1, β_i)$, i=0, 1, . . . , I−1. The second information is the second precoding matrix index number of the precoding matrix in the codebook defined for the antenna ports whose quantity is greater than 4 in the LTE Rel-10 and later releases. Then the corresponding precoding matrix on the subband may be obtained according to the matrix $f(W_1, β_i)$ and $W_2$ corresponding to the second information.

For example, it is assumed that the rank fed back by the terminal for the precoding matrix is 1, $W_1$ corresponding to the first PMI of the precoding matrix in the codebook subset is the same as $W_1^*$ of an 8-antenna codebook in the LTE Rel-10 and later releases, $W_2$ corresponding to the second information of the second PMI is the same as $W_2^*$ of the 8-antenna codebook in the LTE Rel-10 and later releases, the vector denoted by the third PMI is $\{[1, j], [j,−1], [−1,−j], [−j,1]\}$, and the first information included in the second PMI is 1 bit, and is used to select a phase value in the vector denoted by the third PMI. Assuming that 5 subbands are defined in the wireless communications system and the values of the first PMIs fed back by the terminal for all subbands are 0, $W_1$ corresponding to the first PMI is:

$$W_1 = \begin{bmatrix} X_0 & 0 \\ 0 & X_0 \end{bmatrix}, X_0 = \begin{bmatrix} 1 & 1 & 1 & 1 \\ 1 & e^{j2\pi\frac{1}{32}} & e^{j2\pi\frac{2}{32}} & e^{j2\pi\frac{3}{32}} \\ 1 & e^{j2\pi\frac{2}{32}} & e^{j2\pi\frac{4}{32}} & e^{j2\pi\frac{6}{32}} \\ 1 & e^{j2\pi\frac{3}{32}} & e^{j2\pi\frac{6}{32}} & e^{j2\pi\frac{9}{32}} \end{bmatrix}.$$

The second PMI fed back by the terminal for each subband and the second PMI corresponding to each subband are respectively denoted by:

$$\{a_1 a_2\} = \{[0,0],[1,1],[1,2],[0,3][1,4]\},$$

where $a_1$ denotes the first information of the second PMI, that is, selecting a phase value in the vector denoted by the third PMI, $a_2$ denotes the second information of the second PMI, that is, an index number of $W_2$, and the vector denoted by the third PMI fed back by UE is $[j,−1]$, Matrices $W_2$ denoted by the second information $a_2$ of the second PMIs are respectively:

$$W_{2,subband\,1} = \begin{pmatrix} \tilde{e}_1 \\ \tilde{e}_1 \end{pmatrix}, W_{2,subband\,2} = \begin{pmatrix} \tilde{e}_1 \\ j\tilde{e}_1 \end{pmatrix}, W_{2,subband\,3} = \begin{pmatrix} \tilde{e}_1 \\ -\tilde{e}_1 \end{pmatrix},$$

$$W_{2,subband\,4} = \begin{pmatrix} \tilde{e}_1 \\ -j\tilde{e}_1 \end{pmatrix}, W_{2,subband\,5} = \begin{pmatrix} \tilde{e}_2 \\ \tilde{e}_2 \end{pmatrix}.$$

The precoding matrices that are corresponding to all the subbands and determined according to the first PMI, the second PMI, and the third PMI that are fed back by the terminal are respectively:

$$W_{subband1} = f(W_1^0, β=j)W_{2,subband1},$$

$$W_{subband2} = f(W_1^0, β=-1)W_{2,subband2};$$

$$W_{subband3} = f(W_1^0, β=-1)W_{2,subband3},$$

$$W_{subband4} = f(W_1^0, β=j)W_{2,subband4}; \text{ and}$$

$$W_{subband5} = f(W_1^0, β=-1)W_{2,subband5}.$$

Based on the foregoing embodiment, preferably, some or all of the precoding matrices in the codebook subset in this embodiment of the present invention may be obtained by performing down-sampling on the precoding matrix obtained from Formula 1. In this way, a quantity of precoding matrices in the codebook subset can be reduced, and feedback overheads can be reduced.

For example, down-sampling is performed on $W_1$, a quantity of matrices $W_1$ is halved, and a quantity of matrices $W_2$ remains unchanged. Specifically, $$W_1 = \begin{bmatrix} X_k & 0 \\ 0 & X_k \end{bmatrix}, k = 0, 2, 4, 6, 8, 10, 12, 14; \text{ or}$$

$$W_1 = \begin{bmatrix} \tilde{X}_k & 0 \\ 0 & \tilde{X}_k \end{bmatrix}, k = 1, 3, 5, 7, 9, 11, 13, 15.$$

For another example, beams corresponding to 4 DFT column vectors of $X_k$ in Formula 1 are set as beams separated by a large spacing, specifically, $$X_k = [b_k \ b_{k+8} \ b_{k+16} \ b_{k+24}], B = [b_0 \ b_1 \ \ldots \ b_{31}],$$

$$B_{1+m,1+n} = e^{j\frac{2\pi mn}{32}}, m = 0, 1, 2, 3, n = 0, 1, \ldots, 31.$$

The corresponding $D_{k,m}(\beta)$ is:

$$D_{k,m}(\beta) = \begin{bmatrix} 1 & 0 & 0 & 0 \\ 0 & 1 & 0 & 0 \\ 0 & 0 & \dfrac{\beta}{e^{j2\pi\frac{2(k+(m-1)*8)}{32}}} & 0 \\ 0 & 0 & 0 & \dfrac{\beta}{e^{j2\pi\frac{2(k+(m-1)*8)}{32}}} \end{bmatrix}.$$

This manner is applicable to a scenario of a long distance between two co-polarized antenna ports that are located in a same horizontal direction. For example, the distance between two antenna ports is 4λ, and λ is a wavelength.

Based on a same invention conception, an embodiment of the present invention provides a second method for feeding back channel state information in a wireless communications system, where the wireless communications system is a multicarrier system, M subcarriers exist in and N subbands are defined in the wireless communications system, a quantity of subcarriers in each subband is greater than 1, and both M and N are positive integers greater than 1. As shown in FIG. 6, the method includes the following steps:

S61. A terminal selects a precoding matrix from a preset codebook subset for each subband in the N subbands according to a configured reference signal, where each precoding matrix in the codebook subset is identified by a first PMI and a second PMI, the precoding matrices selected by the terminal for all subbands in the N subbands correspond to at least two first PMIs, matrices corresponding to the at least two first PMIs have different phase relationships, and the precoding matrix selected by the terminal for each subband in the N subbands corresponds to one second PMI.

S62. The terminal reports the first PMI and the second PMI that are corresponding to each selected precoding matrix.

In this embodiment of the present invention, because the precoding matrices selected by the terminal for all subbands in the N subbands correspond to at least two first PMIs, and the matrices corresponding to the at least two first PMIs have different phase relationships, so that precoding matrices selected by the terminal for different subbands can control a beam in both horizontal and vertical directions.

In this embodiment of the present invention, some or all of the precoding matrices in the codebook subset mentioned in S61 are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, phase spacings between every two adjacent phase values in the phase set are the same. Certainly, phase spacings between every two adjacent phase values in the phase set may be different. That is, phases in the phase set are non-uniformly distributed.

In implementation, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, the some or all of the precoding matrices in the codebook subset are denoted by:

$$W = W_1 W_2 \qquad \text{Formula 2,}$$

where $$W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$$

$X_k$ denotes a DFT column vector, β denotes a phase value in the configured phase set, $\beta \in \{\beta_0, \beta_1, \ldots, \beta_{L-1}\}$, and L is a positive integer; and $W_2$ is a matrix ($W_2$*) corresponding to the second precoding matrix index number of the precoding matrix in the codebook defined for the antenna ports whose quantity is greater than 4 in the LTE Rel-10 and later releases.

In Formula 2, $$\tilde{X}_k = \begin{bmatrix} b_{2k} & b_{2k+1} & b_{2k+2} & b_{2k+3} \\ \beta b_{2k} & \beta b_{2k+1} & \beta b_{2k+2} & \beta b_{2k+3} \end{bmatrix},$$

$$B = [b_0 \ b_1 \ \ldots \ b_{31}], B_{1+m,1+n} = e^{j\frac{2\pi mn}{32}},$$

$$m = 0, 1, n = 0, 1, \ldots, 31,$$

$\beta \in \{\beta_0, \beta_1, \ldots, \beta_{L-1}\}$, and L is a positive integer.

In Formula 2, if a rank of the precoding matrix is 1, $$W_2 = \frac{1}{\sqrt{2}} \begin{bmatrix} Y \\ \varphi Y \end{bmatrix}, Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\},$$

$$\varphi \in \{1 \ j \ -1 \ -j\}.$$

In Formula 2, if the rank of the precoding matrix is 2, $$W_2 \in \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\};$$

$$(Y_1 \; Y_2) \in \left\{ \begin{array}{l} (\tilde{e}_1 \; \tilde{e}_1)(\tilde{e}_2 \; \tilde{e}_2)(\tilde{e}_3 \; \tilde{e}_3)(\tilde{e}_4 \; \tilde{e}_4) \\ (\tilde{e}_1 \; \tilde{e}_2)(\tilde{e}_2 \; \tilde{e}_3)(\tilde{e}_1 \; \tilde{e}_4)(\tilde{e}_2 \; \tilde{e}_4) \end{array} \right\}; \text{ and}$$

$$\tilde{e}_1 = \begin{bmatrix} 1 \\ 0 \\ 0 \\ 0 \end{bmatrix}, \tilde{e}_2 = \begin{bmatrix} 0 \\ 1 \\ 0 \\ 0 \end{bmatrix}, \tilde{e}_3 = \begin{bmatrix} 0 \\ 0 \\ 1 \\ 0 \end{bmatrix}, \tilde{e}_4 = \begin{bmatrix} 0 \\ 0 \\ 0 \\ 1 \end{bmatrix}.$$

In this embodiment of the present invention, the second PMI includes two parts of information. The first information is used to select a first PMI from the at least two first PMIs fed back by the terminal, and the second information is the second precoding matrix index number of the precoding matrix in the codebook defined for the antenna ports whose quantity is greater than 4 in the LTE Rel-10 and later releases. In matrices $W_1$ corresponding to the at least two first PMIs fed back by the terminal, DFT vectors in all the matrices $W_1$ need to be the same, but values of the phase $\beta$ are different. The precoding matrix of each subband is obtained according to $W_1$ selected from the first information of the second PMI and $W_2$ corresponding to the second information of the second PMI.

For example, if the rank of the precoding matrix fed back by the terminal is 1, a value set of $\beta$ is $\{1 \; j \; -1 \; -j\}$, a bandwidth of the wireless communications system corresponds to 5 subbands, and the terminal feeds back two first PMIs, matrices $W_1$ corresponding to the first PMIs are respectively:

$$W_{1,0} = \begin{bmatrix} \tilde{X}_{0,\beta=1} & 0 \\ 0 & \tilde{X}_{0,\beta=1} \end{bmatrix},$$

$$\tilde{X}_{0,\beta=1} = \begin{bmatrix} 1 & 1 & 1 & 1 \\ 1 & e^{j2\pi\frac{1}{32}} & e^{j2\pi\frac{2}{32}} & e^{j2\pi\frac{3}{32}} \\ \begin{bmatrix} 1 \\ 1 \end{bmatrix} & \begin{bmatrix} 1 \\ e^{j2\pi\frac{1}{32}} \end{bmatrix} & \begin{bmatrix} 1 \\ e^{j2\pi\frac{2}{32}} \end{bmatrix} & \begin{bmatrix} 1 \\ e^{j2\pi\frac{3}{32}} \end{bmatrix} \end{bmatrix};$$

$$W_{1,1} = \begin{bmatrix} \tilde{X}_{0,\beta=j} & 0 \\ 0 & \tilde{X}_{0,\beta=j} \end{bmatrix},$$

$$\tilde{X}_{0,\beta=j} = \begin{bmatrix} 1 & 1 & 1 & 1 \\ 1 & e^{j2\pi\frac{1}{32}} & e^{j2\pi\frac{2}{32}} & e^{j2\pi\frac{3}{32}} \\ j\begin{bmatrix} 1 \\ 1 \end{bmatrix} & j\begin{bmatrix} 1 \\ e^{j2\pi\frac{1}{32}} \end{bmatrix} & j\begin{bmatrix} 1 \\ e^{j2\pi\frac{2}{32}} \end{bmatrix} & j\begin{bmatrix} 1 \\ e^{j2\pi\frac{3}{32}} \end{bmatrix} \end{bmatrix}.$$

It can be seen from the foregoing matrices that the DFT vectors in the two matrices $W_1$ are the same, but the values of $\beta$ are different. The first information of the second PMI is 1 bit and is used to select one from the two matrices $W_1$, and the second information of the second PMI corresponds to $W_2$. The terminal feeds back one second PMI for each subband, and the second PMIs corresponding to 5 subbands are denoted by $\{a_1 \; a_2\}$, $\{[0, 0], [1, 1], [1, 2], [0, 3] [1, 4]\}$ respectively, where $a_1$ denotes the first information of the second PMI, that is, selecting an index number of $W_1$, and $a_2$ denotes the second information of the second PMI, that is, the second precoding matrix index number of the precoding matrix in the codebook defined for the antenna ports whose quantity is greater than 4 in the LTE Rel-10 and later releases. The matrices corresponding to the second information of the second PMIs are respectively:

$$W_{2,subband1} = \begin{pmatrix} \tilde{e}_1 \\ \tilde{e}_1 \end{pmatrix}, W_{2,subband2} = \begin{pmatrix} \tilde{e}_1 \\ j\tilde{e}_1 \end{pmatrix}, W_{2,subband3} = \begin{pmatrix} \tilde{e}_1 \\ -\tilde{e}_1 \end{pmatrix},$$

$$W_{2,subband4} = \begin{pmatrix} \tilde{e}_1 \\ -j\tilde{e}_1 \end{pmatrix}, W_{2,subband5} = \begin{pmatrix} \tilde{e}_2 \\ \tilde{e}_2 \end{pmatrix}.$$

According to the first PMI and the second PMI that are fed back by the terminal, the precoding matrices corresponding to all the subbands are respectively:
$W_{subband1} = W_{1,0} W_{2,subband1}$, $W_{subband2} = W_{1,1} W_{2,subband2}$, $W_{subband3} = W_{1,1} W_{2,subband3}$, $W_{subband4} = W_{1,0} W_{2,subband4}$, and $W_{subband5} = W_{1,1} W_{2,subband5}$.

Based on the foregoing embodiment, preferably, some or all of the precoding matrices in the codebook subset in this embodiment of the present invention may be obtained by performing down-sampling on the precoding matrix obtained from Formula 2. In this way, a quantity of precoding matrices in the codebook subset can be reduced, and feedback overheads can be reduced.

For example, down-sampling is performed on $W_1$, a quantity of matrices $W_1$ is halved, and a quantity of matrices $W_2$ remains unchanged. Specifically, $$W_1 = \begin{bmatrix} X_k & 0 \\ 0 & X_k \end{bmatrix}, k = 0, 2, 4, 6, 8, 10, 12, 14; \text{ or}$$

$$W_1 = \begin{bmatrix} \tilde{X}_k & 0 \\ 0 & \tilde{X}_k \end{bmatrix}, k = 1, 3, 5, 7, 9, 11, 13, 15.$$

For another example, beams corresponding to 4 DFT column vectors of $X_k$ in Formula 2 are set as beams separated by a large spacing, specifically, $$\tilde{X}_k = \begin{bmatrix} b_k & b_{k+8} & b_{k+16} & b_{k+24} \\ \beta b_k & \beta b_{k+8} & \beta b_{k+16} & \beta b_{k+24} \end{bmatrix},$$

$B = [b_0 \; b_1 \; \ldots \; b_{31}]$, $B_{1+m,1+n} = e^{j\frac{2\pi mn}{32}}, m = 0, 1, n = 0, 1, \ldots, 31.$ Based on a same invention conception, an embodiment of the present invention provides a first method for receiving channel state information in a wireless communications system, where the wireless communications system is a multicarrier system, M subcarriers exist in and N subbands are defined in the wireless communications system, a quantity of subcarriers in each subband is greater than 1, and both M and N are positive integers greater than 1. This method corresponds to the first feedback method on the terminal side shown in FIG. 5. As shown in FIG. 7, the method includes the following steps:

S71. A base station receives a first PMI, a second PMI, and a third PMI that are reported by a terminal, where the third PMI is used to indicate a phase relationship, first PMIs corresponding to precoding matrices selected by the terminal for all subbands in the N subbands are the same, a precoding matrix selected by the terminal for each subband in the N subbands corresponds to one second PMI, and third PMIs corresponding to the precoding matrices selected by the terminal for all subbands in the N subbands are the same.

S72. The base station determines the precoding matrix corresponding to each subband from a preset codebook subset according to the received first PMI, second PMI, and third PMI, where each precoding matrix in the codebook subset is identified by a first PMI, a second PMI, and a third PMI.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Based on any of the foregoing embodiments, the third PMI may be specifically indicated in the following two preferred manners:

Manner 1: The third PMI is one phase value selected from the preconfigured phase set.

In this manner, preferably, the first PMI is a first precoding matrix index number of the precoding matrix in the codebook defined for the antenna ports whose quantity is greater than 4 in the LTE Rel-10 and later releases.

Preferably, the second PMI is a second precoding matrix index number of the precoding matrix in the codebook defined for the antenna ports whose quantity is greater than 4 in the LTE Rel-10 and later releases.

Manner 2: The third PMI is a phase vector that includes at least two phase values, where the at least two phase values are selected from the preconfigured phase set.

In this manner, preferably, the first PMI is a first precoding matrix index number of the precoding matrix in the codebook defined for the antenna ports whose quantity is greater than 4 in the LTE Rel-10 and later releases.

Preferably, the second PMI includes first information and second information, the first information is used to indicate a phase value selected by the terminal from the third PMI for a subband corresponding to the second PMI, and the second information is a second precoding matrix index number of the precoding matrix in the codebook defined for the antenna ports whose quantity is greater than 4 in the LTE Rel-10 and later releases. That is, for the precoding matrix selected by the terminal for each subband, the first information in the second PMI denotes the phase value in the third PMI corresponding to the precoding matrix, and the second information corresponds to the second precoding matrix index number of the precoding matrix in the codebook defined for the antenna ports whose quantity is greater than 4 in the LTE Rel-10 and later releases.

Based on any of the foregoing preferred manners, the preconfigured phase set includes L elements, each element corresponds to a different phase value, and L is a positive integer. Preferably, phase spacings between every two adjacent phase values in the phase set are the same.

Certainly, phase spacings between every two adjacent phase values in the phase set may be different. That is, phases in the phase set are non-uniformly distributed.

Based on any of the foregoing embodiments, preferably, in S72, the precoding matrix that is corresponding to each subband and determined by the base station is denoted by:

$$W = f(W_1, \beta) W_2 \qquad \text{Formula 1,}$$

where β denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:,1) \ldots \ldots D_{k,m}(\beta) X_k(:,m)]$, $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

It should be noted that because this embodiment of the present invention corresponds to the first feedback method on the terminal side shown in FIG. 5, no repeated description is given herein again. For details, refer to the first feedback method on the terminal side.

Based on a same invention conception, an embodiment of the present invention provides a second method for receiving channel state information in a wireless communications system, where the wireless communications system is a multicarrier system, M subcarriers exist in and N subbands are defined in the wireless communications system, a quantity of subcarriers in each subband is greater than 1, and both M and N are positive integers greater than 1. This method corresponds to the second feedback method on the terminal side shown in FIG. 6. As shown in FIG. 8, the method includes the following steps:

S81. A base station receives a first PMI and a second PMI that are reported by a terminal, where precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI.

S82. The base station determines the precoding matrix corresponding to each subband from a preset codebook subset according to the received first PMI and second PMI, where each precoding matrix in the codebook subset is identified by a first PMI and a second PMI.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, preferably, in S82, the precoding matrix that is corresponding to each subband and determined by the base station is denoted by:

$$W = W_1 W_2 \quad \text{Formula 2,}$$

$$\text{where } W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

It should be noted that because this embodiment of the present invention corresponds to the second feedback method on the terminal side shown in FIG. 6, no repeated description is given herein again. For details, refer to the second feedback method on the terminal side.

Figure 9:
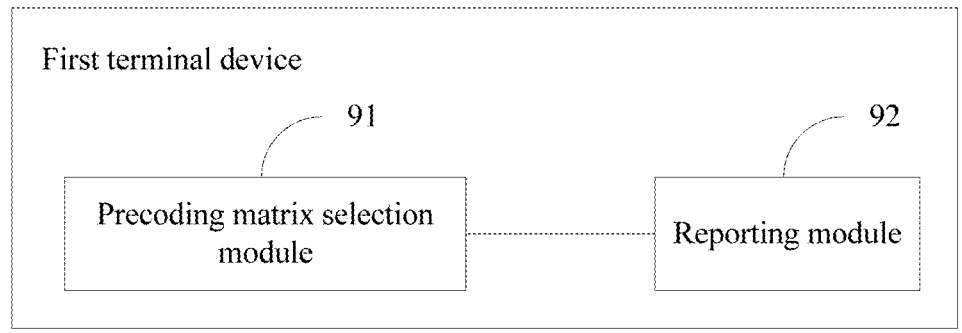
FIG. 9 is a schematic diagram of a first terminal device according to the present invention.

Based on a same invention conception, an embodiment of the present invention provides a first terminal device, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 9, the terminal device includes:

a precoding matrix selection module 91, configured to select a precoding matrix from a preset codebook subset for each subband in the N subbands according to a configured reference signal, where each precoding matrix in the codebook subset is identified by a first PMI, a second PMI, and a third PMI that is used to indicate a phase relationship, first PMIs corresponding to the precoding matrices selected by the precoding matrix selection module 91 for all subbands in the N subbands are the same, the precoding matrix selected by the precoding matrix selection module 91 for each subband in the N subbands corresponds to one second PMI, and third PMIs corresponding to the precoding matrices selected by the precoding matrix selection module 91 for all subbands in the N subbands are the same; and a reporting module 92, configured to report the first PMI, the second PMI, and the third PMI that are corresponding to each precoding matrix selected by the precoding matrix selection module 91.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, the third PMI may be specifically indicated in the following two preferred manners:

the third PMI is one phase value selected from the preconfigured phase set (for details, refer to Manner 1; and no repeated description is given herein again); or the third PMI is a phase vector that includes at least two phase values, where the at least two phase values are selected from the preconfigured phase set (for details, refer to Manner 2; and no repeated description is given herein again).

Based on any of the foregoing preferred manners, the preconfigured phase set includes L elements, each element corresponds to a different phase value, and L is a positive integer. Preferably, phase spacings between every two adjacent phase values in the phase set are the same, thereby ensuring that a channel is uniformly quantized. Certainly, phase spacings between every two adjacent phase values in the phase set may be different. That is, phases in the phase set are non-uniformly distributed.

Based on any of the foregoing embodiments, the first PMI is a first precoding matrix index number of the precoding matrix in the codebook defined for the antenna ports whose quantity is greater than 4 in the LTE Rel-10 and later releases.

Preferably, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the precoding matrix selection module 91 from the third PMI for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, preferably, the some or all of the precoding matrices in the codebook subset are denoted by:

$$W = f(W_1, \beta) W_2,$$

where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:,1) \ldots \ldots D_{k,m}(\beta) X_k(:,m)],$ $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

It should be noted that because the first terminal device provided in this embodiment of the present invention corresponds to the first method for feeding back channel state information in a wireless communications system shown in FIG. 5. For specific implementation, refer to the first method for feeding back channel state information in a wireless communications system shown in FIG. 5. No repeated description is given herein again.

Figure 10:
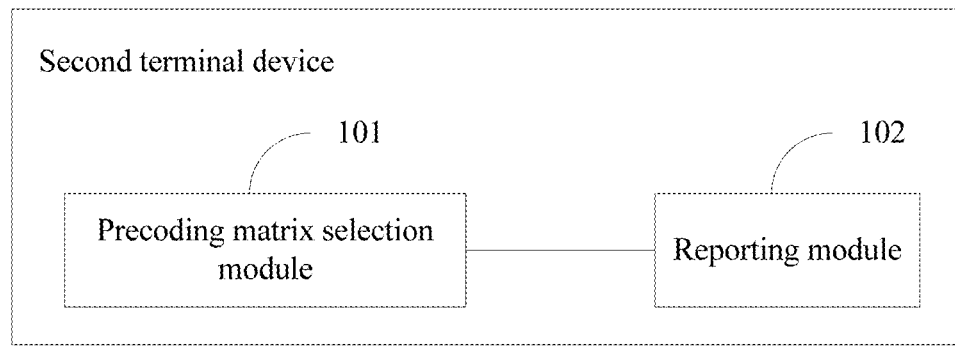
FIG. 10 is a schematic diagram of a second terminal device according to the present invention.

Based on a same invention conception, an embodiment of the present invention provides a second terminal device, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 10, the terminal device includes:

a precoding matrix selection module 101, configured to select a precoding matrix from a preset codebook subset for each subband in the N subbands according to a configured reference signal, where each precoding matrix in the codebook subset is identified by a first PMI and a second PMI, the precoding matrices selected by the precoding matrix selection module 101 for all subbands in the N subbands correspond to at least two first PMIs, matrices corresponding to the at least two first PMIs have different phase relationships, and the precoding matrix selected by the precoding matrix selection module 101 for each subband in the N subbands corresponds to one second PMI; and a reporting module 102, configured to report the first PMI and the second PMI that are corresponding to each precoding matrix selected by the precoding matrix selection module 101.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, phase spacings between every two adjacent phase values in the phase set are the same. Certainly, phase spacings between every two adjacent phase values in the phase set may be different. That is, phases in the phase set are non-uniformly distributed.

Preferably, the second PMI includes first information and second information, the first information is used to indicate a first PMI selected by the precoding matrix selection module 101 from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, the some or all of the precoding matrices in the codebook subset are denoted by:

$$W = W_1 W_2,$$

where $W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$ $X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

It should be noted that because the second terminal device provided in this embodiment of the present invention corresponds to the second method for feeding back channel state information in a wireless communications system shown in FIG. 6. For specific implementation, refer to the second method for feeding back channel state information in a wireless communications system shown in FIG. 6. No repeated description is given herein again.

The first terminal device and the second terminal device may be two separate terminal devices, or may be integrated in one terminal device. According to a denotation form of a precoding matrix, different function modules are selected to select a precoding matrix for each subband in the N subbands in the wireless communications system. For example, if the precoding matrix is denoted by Formula 1, the terminal device uses the precoding matrix selection module 91 in FIG. 9 to select a precoding matrix for each subband in the N subbands in the wireless communications system, and the terminal device uses the reporting module 92 in FIG. 9 to report the first PMI, the second PMI, and the third PMI that are corresponding to each selected precoding matrix to the base station. If the precoding matrix is denoted by Formula 2, the terminal device uses the precoding matrix selection module 101 in FIG. 10 to select a precoding matrix for each subband in the N subbands in the wireless communications system, and the terminal device uses the reporting module 102 in FIG. 10 to report the first PMI and the second PMI that are corresponding to each selected precoding matrix.

Figure 11:
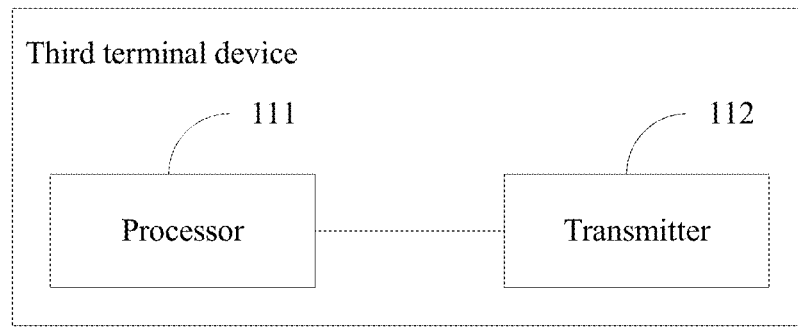
FIG. 11 is a schematic diagram of a third terminal device according to the present invention.

Based on a same invention conception, an embodiment of the present invention provides a third terminal device, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 11, the terminal device includes:

a processor 111, configured to select a precoding matrix from a preset codebook subset for each subband in the N subbands according to a configured reference signal, where each precoding matrix in the codebook subset is identified by a first PMI, a second PMI, and a third PMI that is used to indicate a phase relationship, first PMIs corresponding to the precoding matrices selected by the processor 111 for all subbands in the N subbands are the same, the precoding matrix selected by the processor 111 for each subband in the N subbands corresponds to one second PMI, and third PMIs corresponding to the precoding matrices selected by the processor 111 for all subbands in the N subbands are the same; and a transmitter 112, configured to report the first PMI, the second PMI, and the third PMI that are corresponding to each precoding matrix selected by the processor 111.

The processor 111 is connected to the transmitter 112 by using a bus.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, the third PMI may be specifically indicated in the following two preferred manners:

the third PMI is one phase value selected from the preconfigured phase set (for details, refer to Manner 1; and no repeated description is given herein again); or the third PMI is a phase vector that includes at least two phase values, where the at least two phase values are selected from the preconfigured phase set (for details, refer to Manner 2; and no repeated description is given herein again).

Based on any of the foregoing preferred manners, the preconfigured phase set includes L elements, each element corresponds to a different phase value, and L is a positive integer. Preferably, phase spacings between every two adjacent phase values in the phase set are the same, thereby ensuring that a channel is uniformly quantized. Certainly, phase spacings between every two adjacent phase values in the phase set may be different. That is, phases in the phase set are non-uniformly distributed.

Based on any of the foregoing embodiments, the first PMI is a first precoding matrix index number of the precoding matrix in the codebook defined for the antenna ports whose quantity is greater than 4 in the LTE Rel-10 and later releases.

Preferably, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the processor 111 from the third PMI for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, preferably, the some or all of the precoding matrices in the codebook subset are denoted by:

$$W = f(W_1, \beta) W_2,$$

where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:,1) \ldots \ldots D_{k,m}(\beta) X_k(:,m)]$, $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j 2\pi \frac{2(2k+(m-1))}{32}}} & 0 \\ 0 & 0 & 0 & \dfrac{\beta}{e^{j 2\pi \frac{2(2k+(m-1))}{32}}} \end{bmatrix}.$$

It should be noted that because the third terminal device provided in this embodiment of the present invention corresponds to the first method for feeding back channel state information in a wireless communications system shown in FIG. 5. For specific implementation, refer to the first method for feeding back channel state information in a wireless communications system shown in FIG. 5. No repeated description is given herein again.

Figure 12:
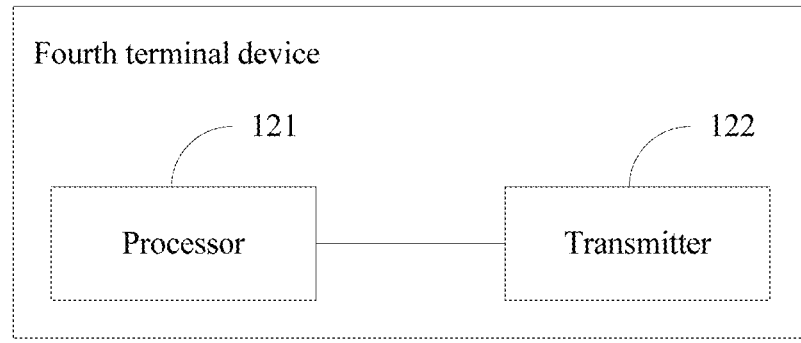
FIG. 12 is a schematic diagram of a fourth terminal device according to the present invention.

Based on a same invention conception, an embodiment of the present invention provides a fourth terminal device, where the terminal device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 12, the terminal device includes:

a processor 121, configured to select a precoding matrix from a preset codebook subset for each subband in the N subbands according to a configured reference signal, where each precoding matrix in the codebook subset is identified by a first PMI and a second PMI, the precoding matrices selected by the processor 121 for all subbands in the N subbands correspond to at least two first PMIs, matrices corresponding to the at least two first PMIs have different phase relationships, and the precoding matrix selected by the processor 121 for each subband in the N subbands corresponds to one second PMI; and a transmitter 122, configured to report the first PMI and the second PMI that are corresponding to each precoding matrix selected by the processor 121.

The processor 121 is connected to the transmitter 122 by using a bus.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, phase spacings between every two adjacent phase values in the phase set are the same. Certainly, phase spacings between every two adjacent phase values in the phase set may be different. That is, phases in the phase set are non-uniformly distributed.

Preferably, the second PMI includes first information and second information, the first information is used to indicate a first PMI selected by the processor 121 from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, the some or all of the precoding matrices in the codebook subset are denoted by:

$$W = W_1 W_2,$$

$$\text{where } W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$ and L is a positive integer; and $W_2$ is a matrix corresponding to the second precoding matrix index number of the precoding matrix in the codebook defined for the antenna ports whose quantity is greater than 4 in the LTE Rel-10 and later releases.

It should be noted that because the fourth terminal device provided in this embodiment of the present invention corresponds to the second method for feeding back channel state information in a wireless communications system shown in FIG. 6. For specific implementation, refer to the second method for feeding back channel state information in a wireless communications system shown in FIG. 6. No repeated description is given herein again.

The first terminal device and the second terminal device may be two separate terminal devices, or may be integrated in one terminal device. According to a denotation form of a precoding matrix, different function modules are selected to select a precoding matrix for each subband in the N subbands in the wireless communications system. For example, if the precoding matrix is denoted by Formula 1, the terminal device uses the processor 111 in FIG. 11 to select a precoding matrix for each subband in the N subbands in the wireless communications system, and the terminal device uses the transmitter 122 in FIG. 11 to report the first PMI, the second PMI, and the third PMI that are corresponding to each selected precoding matrix to the base station. If the precoding matrix is denoted by Formula 2, the terminal device uses the processor 121 in FIG. 12 to select a precoding matrix for each subband in the N subbands in the wireless communications system, and the terminal device uses the transmitter 122 in FIG. 12 to report the first PMI and the second PMI that are corresponding to each selected precoding matrix to the base station.

Figure 13:
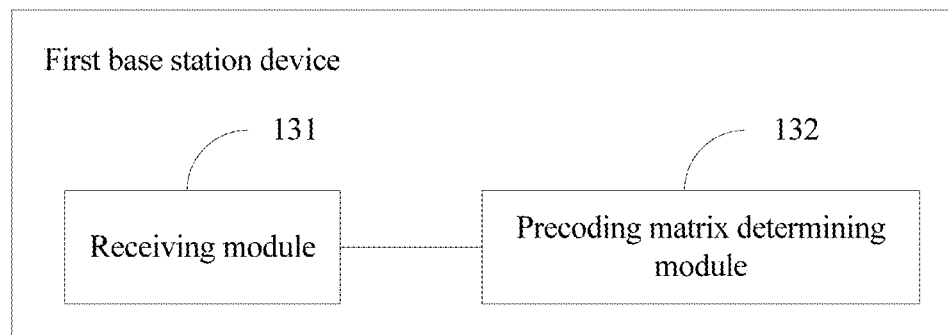
FIG. 13 is a schematic diagram of a first base station device according to the present invention.

Based on a same invention conception, an embodiment of the present invention provides a first base station device, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 13, the base station device includes:

a receiving module 131, configured to receive a first PMI, a second PMI, and a third PMI that are reported by a terminal, where the third PMI is used to indicate a phase relationship, first PMIs corresponding to precoding matrices selected by the terminal for all subbands in the N subbands are the same, a precoding matrix selected by the terminal for each subband in the N subbands corresponds to one second PMI, and third PMIs corresponding to the precoding matrices selected by the terminal for all subbands in the N subbands are the same; and a precoding matrix determining module 132, configured to determine the precoding matrix corresponding to each subband from a preset codebook subset according to the first PMI, the second PMI, and the third PMI that are received by the receiving module 131, where each precoding matrix in the codebook subset is identified by a first PMI, a second PMI, and a third PMI.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, the third PMI may be specifically indicated in the following two preferred manners:

the third PMI is one phase value selected from the preconfigured phase set (for details, refer to Manner 1; and no repeated description is given herein again); or the third PMI is a phase vector that includes at least two phase values, where the at least two phase values are selected from the preconfigured phase set (for details, refer to Manner 2; and no repeated description is given herein again).

Based on any of the foregoing preferred manners, the preconfigured phase set includes L elements, each element corresponds to a different phase value, and L is a positive integer. Preferably, phase spacings between every two adjacent phase values in the phase set are the same, thereby ensuring that a channel is uniformly quantized. Certainly, phase spacings between every two adjacent phase values in the phase set may be different. That is, phases in the phase set are non-uniformly distributed.

Based on any of the foregoing embodiments, the first PMI is a first precoding matrix index number of the precoding matrix in the codebook defined for the antenna ports whose quantity is greater than 4 in the LTE Rel-10 and later releases.

Preferably, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the terminal from the third PMI for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, the precoding matrix that is corresponding to each subband and determined by the precoding matrix determining module 132 is denoted by:

$$W = f(W_1, \beta) W_2,$$

where $\beta$ denotes the phase value corresponding to the third PMI, $\beta \in \{\beta_0, \beta_1, \ldots, \beta_{L-1}\}$, and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix}, k = 0, 1, \ldots, 15,$$

where $\tilde{X}_k = [D_{k,1}(\beta) X_k(:, 1) \ldots \ldots D_{k,m}(\beta) X_k(:, m)]$, $X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

It should be noted that because the first base station device provided in this embodiment of the present invention corresponds to the first method for receiving channel state information in a wireless communications system shown in FIG. 7. For specific implementation, refer to the first method for receiving channel state information in a wireless communications system shown in FIG. 7. No repeated description is given herein again.

Figure 14:
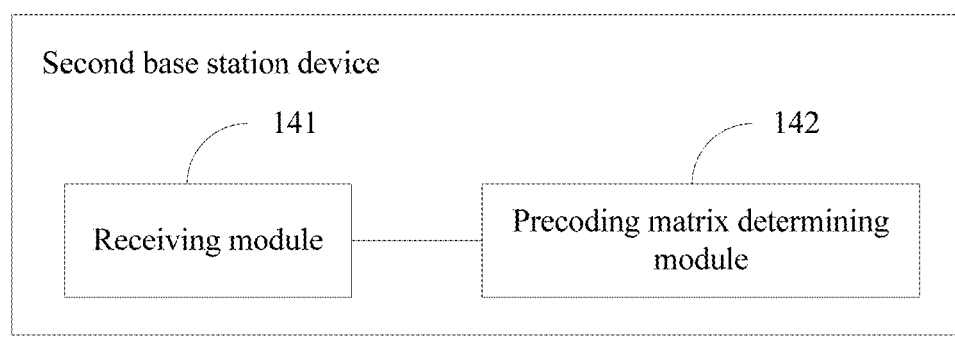
FIG. 14 is a schematic diagram of a second base station device according to the present invention.

Based on a same invention conception, an embodiment of the present invention provides a second base station device, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 14, the base station device includes:

a receiving module 141, configured to receive a first PMI and a second PMI that are reported by a terminal, where precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI; and a precoding matrix determining module 142, configured to determine the precoding matrix corresponding to each subband from a preset codebook subset according to the first PMI and the second PMI that are received by the receiving module 141, where each precoding matrix in the codebook subset is identified by a first PMI and a second PMI.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, phase spacings between every two adjacent phase values in the phase set are the same. Certainly, phase spacings between every two adjacent phase values in the phase set may be different. That is, phases in the phase set are non-uniformly distributed.

Preferably, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, the precoding matrix that is corresponding to each subband and determined by the precoding matrix determining module 142 is denoted by:

$$W = W_1 W_2,$$

where $W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$ $X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

It should be noted that because the second base station device provided in this embodiment of the present invention corresponds to the second method for receiving channel state information in a wireless communications system shown in FIG. 8. For specific implementation, refer to the second method for receiving channel state information in a wireless communications system shown in FIG. 8. No repeated description is given herein again.

The first base station device and the second base station device may be two separate base station devices, or may be integrated in one base station device. According to a denotation form of a precoding matrix, different function modules are selected to select a precoding matrix for each subband in the N subbands in the wireless communications system. For example, if the precoding matrix is denoted by Formula 1, the base station device uses the receiving module 131 in FIG. 13 to receive the first PMI for all subbands, the second PMI for each subband, and the third PMI for all subbands, where the first PMI, the second PMI, and the third PMI are reported by the terminal, and the base station device uses the precoding matrix determining module 132 in FIG. 13 to determine a precoding matrix corresponding to each subband from a preset codebook subset. If the precoding matrix is denoted by Formula 2, the base station device uses the receiving module 141 in FIG. 14 to receive at least one first PMI for all subbands and the second PMI for each subband, where the first PMI and the second PMI are reported by the terminal, and the base station device uses the precoding matrix determining module 142 in FIG. 14 to determine a precoding matrix corresponding to each subband from a preset codebook subset.

Figure 15:
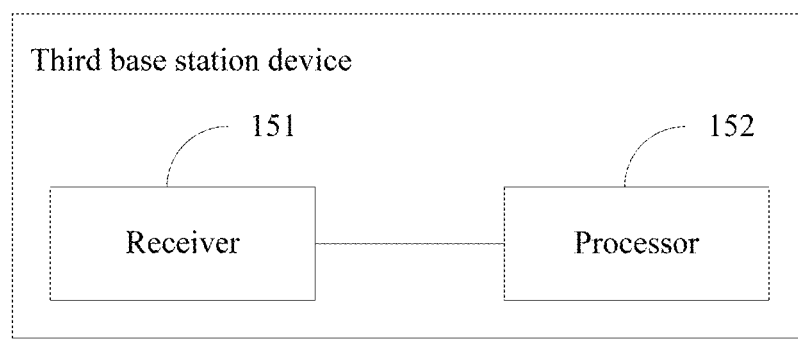
FIG. 15 is a schematic diagram of a third base station device according to the present invention.

Based on a same invention conception, an embodiment of the present invention provides a third base station device, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 15, the base station device includes:

a receiver 151, configured to receive a first PMI, a second PMI, and a third PMI that are reported by a terminal, where the third PMI is used to indicate a phase relationship, first PMIs corresponding to precoding matrices selected by the terminal for all subbands in the N subbands are the same, a precoding matrix selected by the terminal for each subband in the N subbands corresponds to one second PMI, and third PMIs corresponding to the precoding matrices selected by the terminal for all subbands in the N subbands are the same; and a processor 152, configured to determine the precoding matrix corresponding to each subband from a preset codebook subset according to the first PMI, the second PMI, and the third PMI that are received by the receiver 151, where each precoding matrix in the codebook subset is identified by a first PMI, a second PMI, and a third PMI.

The receiver 151 is connected to the processor 152 by using a bus.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, the third PMI may be specifically indicated in the following two preferred manners:

the third PMI is one phase value selected from the preconfigured phase set (for details, refer to Manner 1; and no repeated description is given herein again); or the third PMI is a phase vector that includes at least two phase values, where the at least two phase values are selected from the preconfigured phase set (for details, refer to Manner 2; and no repeated description is given herein again).

Based on any of the foregoing preferred manners, the preconfigured phase set includes L elements, each element corresponds to a different phase value, and L is a positive integer. Preferably, phase spacings between every two adjacent phase values in the phase set are the same, thereby ensuring that a channel is uniformly quantized. Certainly, phase spacings between every two adjacent phase values in the phase set may be different. That is, phases in the phase set are non-uniformly distributed.

Based on any of the foregoing embodiments, the first PMI is a first precoding matrix index number of the precoding matrix in the codebook defined for the antenna ports whose quantity is greater than 4 in the LTE Rel-10 and later releases.

Preferably, if the third PMI is the one phase value selected from the preconfigured phase set, the second PMI is a second precoding matrix index number of the precoding matrix in the codebook defined for the antenna ports whose quantity is greater than 4 in the LTE Rel-10 and later releases; or if the third PMI is the phase vector that includes the at least two phase values, the second PMI includes first information and second information, where the first information is used to indicate a phase value selected by the terminal from the third PMI for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, the precoding matrix that is corresponding to each subband and determined by the processor 152 is denoted by:

$$W = f(W_1, \beta) W_2,$$

where $\beta$ denotes the phase value corresponding to the third PMI, $\beta \in \{\beta_0, \beta_1, \ldots, \beta_{L-1}\}$ and L is a positive integer; $W_1$ is a matrix corresponding to the first precoding matrix index number of the precoding matrix in the codebook defined for the antenna ports whose quantity is greater than 4 in the LTE Rel-10 and later releases; and $W_2$ is a matrix corresponding to the second precoding matrix index number of the precoding matrix in the codebook defined for the antenna ports whose quantity is greater than 4 in the LTE Rel-10 and later releases, where the precoding matrix in the codebook defined for the antenna ports whose quantity is greater than 4 in the LTE Rel-10 and later releases is identified by the first precoding matrix index number and the second precoding matrix index number; and $$f(W_1, \beta) = \begin{bmatrix} \tilde{X}_k & 0 \\ 0 & \tilde{X}_k \end{bmatrix},$$

$$k = 0, 1, \ldots, 15,$$

where $$\tilde{X}_k = [\, D_{k,1}(\beta) X_k(:,1) \; \ldots \; \ldots \; D_{k,m}(\beta) X_k(:,m) \,],$$

$X_k$ denotes a discrete Fourier transform DFT column vector, m denotes a quantity of antenna ports configured in a same horizontal location, and $$D_{k,m}(\beta) = \begin{bmatrix} 1 & 0 & 0 & 0 \\ 0 & 1 & 0 & 0 \\ 0 & 0 & \dfrac{\beta}{e^{j2\pi \frac{2(2k+(m-1))}{32}}} & 0 \\ 0 & 0 & 0 & \dfrac{\beta}{e^{j2\pi \frac{2(2k+(m-1))}{32}}} \end{bmatrix}.$$

It should be noted that because the third base station device provided in this embodiment of the present invention corresponds to the first method for receiving channel state information in a wireless communications system shown in FIG. 7. For specific implementation, refer to the first method for receiving channel state information in a wireless communications system shown in FIG. 7. No repeated description is given herein again.

Figure 16:
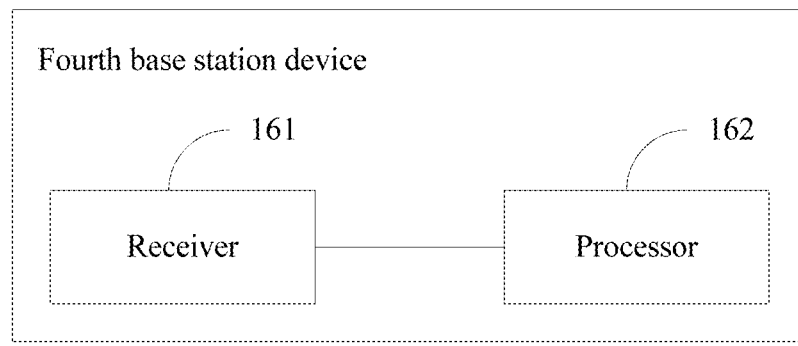
FIG. 16 is a schematic diagram of a fourth base station device according to the present invention.

Based on a same invention conception, an embodiment of the present invention provides a fourth base station device, where the base station device is applied to a wireless communications system, the wireless communications system is a multicarrier system, M subcarriers exist in and N subbands are defined in the wireless communications system, a quantity of subcarriers in each subband is greater than 1, and both M and N are positive integers greater than 1. As shown in FIG. 16, the base station device includes:

a receiver 161, configured to receive a first PMI and a second PMI that are reported by a terminal, where precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI; and a processor 162, configured to determine the precoding matrix corresponding to each subband from a preset codebook subset according to the first PMI and the second PMI that are received by the receiver 161, where each precoding matrix in the codebook subset is identified by a first PMI and a second PMI.

The receiver 161 is connected to the processor 162 by using a bus.

Preferably, some or all of the precoding matrices in the codebook subset are obtained by means of transformation according to a precoding matrix in a first codebook and a phase value in a preconfigured phase set, where the first codebook is a codebook defined for antenna ports whose quantity is greater than 4 in a Long Term Evolution LTE release Rel-10 and later releases.

Preferably, phase spacings between every two adjacent phase values in the phase set are the same. Certainly, phase spacings between every two adjacent phase values in the phase set may be different. That is, phases in the phase set are non-uniformly distributed.

Preferably, the second PMI includes first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

Based on any of the foregoing embodiments, the precoding matrix that is corresponding to each subband and determined by the processor 162 is denoted by:

$$W = W_1 W_2,$$

$$\text{where } W_1 = \begin{bmatrix} \tilde{X}_k & 0 \\ 0 & \tilde{X}_k \end{bmatrix}, k = 0, 1, \ldots, 15, \tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

It should be noted that because the fourth base station device provided in this embodiment of the present invention corresponds to the second method for receiving channel state information in a wireless communications system shown in FIG. 8. For specific implementation, refer to the second method for receiving channel state information in a wireless communications system shown in FIG. 8. No repeated description is given herein again.

The third base station device and the fourth base station device may be two separate base station devices, or may be integrated in one base station device. According to a denotation form of a precoding matrix, different function modules are selected to select a precoding matrix for each subband in the N subbands in the wireless communications system. For example, if the precoding matrix is denoted by Formula 1, the base station device uses the receiver 151 in FIG. 15 to receive the first PMI for all subbands, the second PMI for each subband, and the third PMI for all subbands, where the first PMI, the second PMI, and the third PMI are reported by the terminal, and the base station device uses the processor 152 in FIG. 15 to determine a precoding matrix corresponding to each subband from a preset codebook subset. If the precoding matrix is denoted by Formula 2, the base station device uses the receiver 161 in FIG. 16 to receive at least one first PMI for all subbands and the second PMI for each subband, where the first PMI and the second PMI are reported by the terminal, and the base station device uses the processor 162 in FIG. 16 to determine a precoding matrix corresponding to each subband from a preset codebook subset.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A terminal device, applied to a wireless communications system, wherein the wireless communications system is a multicarrier system, M subcarriers exist in and N subbands are defined in the wireless communications system, a quantity of subcarriers in each subband is greater than 1, and both M and N are positive integers greater than 1, wherein the terminal device comprises:

a precoding matrix selection module, configured to select a precoding matrix from a preset codebook subset for each subband in the N subbands according to a configured reference signal, wherein each precoding matrix in the codebook subset is identified by a first precoding matrix indicator PMI and a second PMI, the precoding matrices selected by the precoding matrix selection module for all subbands in the N subbands correspond to at least two first PMIs, matrices corresponding to the at least two first PMIs have different phase relationships, and the precoding matrix selected by the precoding matrix selection module for each subband in the N subbands corresponds to one second PMI; and a reporting module, configured to report the first PMI and the second PMI that are corresponding to each precoding matrix selected by the precoding matrix selection module.

2. The terminal device according to claim 1, wherein some or all of the precoding matrices in the codebook subset are obtained by means of transformation according to a precoding matrix in a first codebook and a phase value in a preconfigured phase set, wherein the first codebook is a codebook defined for antenna ports whose quantity is greater than 4 in a Long Term Evolution LTE release Rel-10 and later releases.

3. The terminal device according to claim 1, wherein the second PMI comprises first information and second information, the first information is used to indicate a first PMI selected by the precoding matrix selection module from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

4. The terminal device according to claim 1, wherein some or all of the precoding matrices in the codebook subset are denoted by:

$$W = W_1 W_2,$$

wherein $$W_1 = \begin{bmatrix} \tilde{X}_k & 0 \\ 0 & \tilde{X}_k \end{bmatrix},$$

$$k = 0, 1, \ldots, 15,$$

$$\tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

5. A base station, applied to a wireless communications system, wherein the wireless communications system is a multicarrier system, M subcarriers exist in and N subbands are defined in the wireless communications system, a quantity of subcarriers in each subband is greater than 1, and both M and N are positive integers greater than 1, wherein the base station device comprises:

a receiving module, configured to receive a first precoding matrix indicator PMI and a second PMI that are reported by a terminal, wherein precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI; and a precoding matrix determining module, configured to determine the precoding matrix corresponding to each subband from a preset codebook subset according to the received first PMI and second PMI, wherein each precoding matrix in the codebook subset is identified by a first PMI and a second PMI.

6. The base station according to claim 5, wherein some or all of the precoding matrices in the codebook subset are obtained by means of transformation according to a precoding matrix in a first codebook and a phase value in a preconfigured phase set, wherein the first codebook is a codebook defined for antenna ports whose quantity is greater than 4 in a Long Term Evolution LTE release Rel-10 and later releases.

7. The base station according to claim 5, wherein the second PMI comprises first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

8. The base station according to claim 5, wherein the precoding matrix that is corresponding to each subband and determined by the precoding matrix determining module is denoted by:

$$W = W_1 W_2,$$

wherein $$W_1 = \begin{bmatrix} \tilde{X}_k & 0 \\ 0 & \tilde{X}_k \end{bmatrix},$$

$$k = 0, 1, \ldots, 15,$$

$$\tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

9. A method for feeding back channel state information in a wireless communications system, wherein the wireless communications system is a multicarrier system, M subcarriers exist in and N subbands are defined in the wireless communications system, a quantity of subcarriers in each subband is greater than 1, and both M and N are positive integers greater than 1, wherein the method comprises:

selecting, by a terminal, a precoding matrix from a preset codebook subset for each subband in the N subbands according to a configured reference signal, wherein each precoding matrix in the codebook subset is identified by a first precoding matrix indicator PMI and a second PMI, the precoding matrices selected by the terminal for all subbands in the N subbands correspond to at least two first PMIs, matrices corresponding to the at least two first PMIs have different phase relationships, and the precoding matrix selected by the terminal for each subband in the N subbands corresponds to one second PMI; and reporting, by the terminal, the first PMI and the second PMI that are corresponding to each selected precoding matrix.

10. The method according to claim 9, wherein some or all of the precoding matrices in the codebook subset are obtained by means of transformation according to a precoding matrix in a first codebook and a phase value in a preconfigured phase set, wherein the first codebook is a codebook defined for antenna ports whose quantity is greater than 4 in a Long Term Evolution LTE release Rel-10 and later releases.

11. The method according to claim 9, wherein the second PMI comprises first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

12. The method according to claim 9, wherein the some or all of the precoding matrices in the codebook subset are denoted by:

$$W = W_1 W_2,$$

wherein $$W_1 = \begin{bmatrix} \tilde{X}_k & 0 \\ 0 & \tilde{X}_k \end{bmatrix},$$

$$k = 0, 1, \ldots, 15,$$

$$\tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

13. A method for receiving channel state information in a wireless communications system, wherein the wireless communications system is a multicarrier system, M subcarriers exist in and N subbands are defined in the wireless communications system, a quantity of subcarriers in each subband is greater than 1, and both M and N are positive integers greater than 1, wherein the method comprises:

receiving, by a base station, a first precoding matrix indicator PMI and a second PMI that are reported by a terminal, wherein precoding matrices selected by the terminal for all subbands in the N subbands correspond to at least two first PMIs, matrices corresponding to the at least two first PMIs have different phase relationships, and a precoding matrix selected by the terminal for each subband in the N subbands corresponds to one second PMI; and determining, by the base station, the precoding matrix corresponding to each subband from a preset codebook subset according to the received first PMI and second PMI, wherein each precoding matrix in the codebook subset is identified by a first PMI and a second PMI.

14. The method according to claim 13, wherein some or all of the precoding matrices in the codebook subset are obtained by means of transformation according to a precoding matrix in a first codebook and a phase value in a preconfigured phase set, wherein the first codebook is a codebook defined for antenna ports whose quantity is greater than 4 in a Long Term Evolution LTE release Rel-10 and later releases.

15. The method according to claim 13, wherein the second PMI comprises first information and second information, the first information is used to indicate a first PMI selected by the terminal from the at least two first PMIs for a subband corresponding to the second PMI, and the second information is a second precoding matrix index number of the precoding matrix in the codebook defined for the antenna ports whose quantity is greater than 4 in the LTE Rel-10 and later releases.

16. The method according to claim 13, wherein the precoding matrix that is corresponding to each subband and determined by the base station is denoted by:

$W = W_1 W_2,$ wherein $$W_1 = \begin{bmatrix} \tilde{X}_k & 0 \\ 0 & \tilde{X}_k \end{bmatrix},$$

$k = 0, 1, \ldots, 15,$ $$\tilde{X}_k = \begin{bmatrix} X_k \\ \beta X_k \end{bmatrix},$$

$X_k$ denotes a DFT column vector, $\beta$ denotes a phase value in the configured phase set, $\beta \in \{\beta_0, \beta_1, \ldots, \beta_{L-1}\}$, and L is a positive integer; and $W_2$ is a matrix corresponding to the second precoding matrix index number of the precoding matrix in the codebook defined for the antenna ports whose quantity is greater than 4 in the LTE Rel-10 and later releases.

* * * * *